US012167201B2

(12) United States Patent
De Vries et al.

(10) Patent No.: US 12,167,201 B2
(45) Date of Patent: Dec. 10, 2024

(54) OWN VOICE DETECTION ON A HEARING DEVICE AND A BINAURAL HEARING DEVICE SYSTEM AND METHODS THEREOF

(71) Applicant: GN Hearing A/S, Ballerup (DK)

(72) Inventors: Rob De Vries, Ballerup (DK); Changxue Ma, Ballerup (DK); Srdjan Petrovic, Ballerup (DK)

(73) Assignee: GN HEARING A/S, Ballerup (DK)

(*) Notice: Subject to any disclaimer, the term of this patent is extended or adjusted under 35 U.S.C. 154(b) by 50 days.

(21) Appl. No.: 17/831,397

(22) Filed: Jun. 2, 2022

(65) Prior Publication Data

US 2023/0396942 A1 Dec. 7, 2023

(51) Int. Cl.
*H04R 25/00* (2006.01)

(52) U.S. Cl.
CPC ....... *H04R 25/552* (2013.01); *H04R 2460/01* (2013.01)

(58) Field of Classification Search
None
See application file for complete search history.

(56) References Cited

U.S. PATENT DOCUMENTS

| | | | | |
|---|---|---|---|---|
| 6,728,385 B2 * | 4/2004 | Kvaloy | ................ | H04R 1/1016 381/328 |
| 2011/0293103 A1 * | 12/2011 | Park | ................ | G10K 11/17854 381/57 |
| 2018/0146307 A1 | 5/2018 | Petersen et al. | | |
| 2019/0394586 A1 | 12/2019 | Pedersen et al. | | |
| 2022/0132252 A1 | 4/2022 | Pedersen et al. | | |

OTHER PUBLICATIONS

Extended European Search Report for EP Patent Appln. No. 23156331.3 dated Aug. 7, 2023.

* cited by examiner

*Primary Examiner* — Kenny H Truong
(74) *Attorney, Agent, or Firm* — Vista IP Law Group, LLP

(57) ABSTRACT

A hearing device includes a first input transducer configured for providing a first electric input signal, a second input transducer configured for providing a second electric input signal, a voice detector module configured to detect own voice of a user based on one or more detection criteria, the voice detector comprising a first band-pass filter configured for band-pass filtering the first electric input signal and a second band-pass filter configured for band-pass filtering the second electric input signal. The hearing device further comprises a processing unit configured to provide a first electric output signal based on the first and second electric input signals; and an output transducer configured to provide an acoustic output signal, wherein the voice detector module is further configured for notifying a detection of the own voice to the processing unit if one or more of the detection criteria are satisfied.

24 Claims, 6 Drawing Sheets

OWN VOICE DETECTION ON A HEARING DEVICE AND A BINAURAL HEARING DEVICE SYSTEM AND METHODS THEREOF

FIELD

The present disclosure relates to hearing devices. More specifically, the disclosure relates to a hearing device comprising input transducers and a voice detection module configured for detecting own voice of a user, such as detecting own voice activity of a user, particularly being configured for detecting own voice of a user based on one or more detection criteria. The present disclosure additionally relates to bilateral hearing device systems comprising such a hearing device, and a method of operating such a hearing device and system.

BACKGROUND

Own-voice detection is becoming more and more important due to higher communication requirements and the merging of different use cases and functionalities for sound devices, for example the use of hearing-aid functionalities and music streamer functionalities in a same device. This multi-purpose usage could require different processing schemes depending on these different requirements. For some use cases, such different functionalities may be dependent on or triggered by a user's own voice. Therefore, there is increased demand for hearing devices being able to consistently determine whether the user is talking.

Additionally, when using beamforming technologies to e.g. suppress sound sources from other directions than the source of interest, the users own voice may be over-amplified due to its near-field properties, compared to other sound sources in the environment typically being 1-3 meters away from a user and having far-field characteristics. Such over-amplification may make the perception of own voice unnatural and loud.

SUMMARY

Disclosed is a hearing device. The hearing device comprises a first input transducer configured for providing a first electric input signal. The hearing device comprises a second input transducer configured for providing a second electric input signal. The hearing device comprises a voice detector module configured for processing the first electric input signal and the second electric input signal. The voice detector module is configured for detecting own voice of a user of the hearing device based on one or more detection criteria. The voice detector comprises a first band-pass filter configured for band-pass filtering the first electric input signal. The voice detector comprises a second band-pass filter configured for band-pass filtering the second electric input signal. The hearing device comprises a processing unit configured for processing the first electric input signal and the second electric input signal. The processing unit is configured for providing a first electric output signal based on the first electric input signal and the second electric input signal. The hearing device comprises an output transducer configured for converting the first electric output signal into an acoustic output signal. The voice detector module is further configured for notifying a detection of the own voice to the processing unit if one or more of the detection criteria are satisfied.

It is an advantage that own voice, such as own voice activity of a user of hearing device(s), can be detected if one or more detection criteria are satisfied. As hearing devices have increased versatility, also the processing of input signals may need to be adapted to different use scenarios. It is an advantage of being able to detect own voice that the processing of input signals in various scenarios may be adapted in dependence on whether own voice is detected or not, that is in dependence on own voice detection.

For example, when listening to music, such as particularly bass sounds, any occlusion of the own-voice should not interfere with the music. In such a scenario, it could be advantageous to activate an active-occlusion-cancellation. In other scenarios different processing schemes may be preferable when own voice is detected. It is an advantage of activating such different processing schemes, such as e.g. active-occlusion-cancellation, only when necessary, i.e. when the user is talking and own voice is detected, to avoid using excessive processing power when that is not necessary, to thereby also avoid draining a power supply too fast.

In an embodiment, the hearing device is configured to be worn by a user. The hearing device may be arranged at the user's ear, on the user's ear, over the user's ear, in the user's ear, in the user's ear canal, behind the user's ear and/or in the user's concha, i.e., the hearing device is configured to be worn in, on, over and/or at the user's ear. The hearing device may be configured for being provided in an operational position in, on, over and/or at the user's ear. The user may wear two hearing devices, one hearing device at each ear. The two hearing devices may be connected, such as wirelessly connected and/or connected by wires, such as a binaural hearing device system or bilateral hearing device system.

The hearing device may be a hearable such as a headset, headphone, earphone, earbud, hearing aid, a personal sound amplification product (PSAP), an over-the-counter (OTC) hearing device, a hearing protection device, a one-size-fits-all hearing device, a custom hearing device or another head-wearable hearing device. Hearing devices can include both prescription devices and non-prescription devices.

The hearing device may be embodied in various housing styles or form factors. Some of these form factors are Behind-the-Ear (BTE) hearing device and Receiver-in-Canal (RIC) hearing device also known as Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprise in the ITE unit, which is coupled to the BTE unit via a connector cable or wire configured for transferring electric signals between the BTE and ITE units.

Some of these form factors are In-the-Ear (ITE) hearing device, Completely-in-Canal (CIC) hearing device or Invisible-in-Canal (IIC) hearing device. These hearing devices may comprise an ITE unit, wherein the ITE unit may comprise at least one input transducer, a power source, a processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal.

Some of these form factors are earbuds, on the ear headphones or over the ear headphones. The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

The hearing device comprises one or more input transducers, such as the first input transducer, the second input transducer, etc. The input transducers are configured for receiving acoustic signals from sound source(s) in the environment and convert such acoustic signals to electric input signals. The hearing device comprises the first input transducer configured for providing the first electric input signal. The hearing device comprises the second input transducer configured for providing the second electric input signal. The one or more input transducers may comprise one or more microphones. The first input transducer may be configured for converting an acoustic signal into the first electric input signal. The second input transducer may be configured for converting an acoustic signal into the second electric input signal. The first and second electric input signals may be analogue signals. The first and second electric input signal may be digital signals. The first and second input transducers may be coupled to one or more analogue-to-digital converter(s) configured for converting analogue first and second input signals into digital first and second input signals, respectively.

The hearing device comprises the voice detector module configured for processing the first electric input signal and the second electric input signal. The voice detector module may comprise one or more filter circuits comprising one or more filters configured for processing the first electric input signal and the second electric input signal. The one or more filter circuits may be configured for processing the first electric input signal and the second electric input signal at a same time or one filter circuit at a time.

The voice detector module is configured for detecting own voice of the user of the hearing device based on one or more detection criteria. In other words, the voice detector module may be configured for determining if own voice is detected based on the one or more detection criteria. The one or more detection criteria may comprise one detection criterion. The one or more detection criteria may comprise a plurality of detection criteria. The one or more detection criteria may provide an indication or an estimate that own voice is detected. The more of the one or more detection criteria being satisfied, meet or fulfilled, the stronger the indication that own voice is detected may become. The strongest indication that own voice is detected may be provided when all of the one or more detection criteria are met or fulfilled. However, it is an advantage that a reliable own voice detection may be provided even if only one detection criterion, such as one of the one or more detection criteria, is satisfied. It is a further advantage that if more of the one or more detection criteria are satisfied, the detection of own voice may become stronger or more reliable than if fewer of the one or more detection criteria are satisfied.

The voice detector comprises the first band-pass filter configured for band-pass filtering the first electric input signal. The voice detector comprises the second band-pass filter configured for band-pass filtering the second electric input signal. The first and second band-pass filters may be configured for band-pass filtering the first and second electric input signals to extract a frequency band or range in which own voice is usually dominant. The user's own voice is personal and the frequency range in which own voice is dominant may vary from person to person. However, usually, own voice may be dominant in the frequency range of e.g. 50 Hz-4 kHz, such as e.g. 50-150 Hz, 150-300 Hz, 50-300 Hz, 150-600 Hz, or 0.4-1.2 kHz. 1

It is an advantage to perform band-pass filtering of the first electric input signal and of the second electric input signal so that a band-pass filtered first electric input signal and a band-pass filtered second electric input signal are processed by the voice detector and/or processing unit. It is an advantage of band-pass filtering the first and second electric input signals as processing of signals having frequencies within a pre-determined frequency band or range may be performed using less processing power. Additionally, processing first and second band-pass filtered signals, such as signals in a frequency range in which own voice is typically dominant, may enable use and design of components particularly efficient within such frequency range. Similar applies for any third and fourth electric input signals being band-pass filtered by third and fourth band-pass filters.

The hearing device comprises the processing unit configured for processing the first electric input signal and the second electric input signal. The processing unit is configured for providing a first electric output signal based on the first electric input signal and the second electric input signal, such as based on the processing of the first electric input signal and the second electric input signal. The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a second electric output signal. The second electric output signal may be based on the processing of the first and/or second electric input signal(s).

The hearing device comprises an output transducer configured for converting the first electric output signal into an acoustic output signal. The output transducer may be coupled to the processing unit. The output transducer may be a receiver. It is noted that in this context, a receiver may be a loudspeaker, whereas a wireless receiver may be a device configured for processing a wireless signal. The output transducer may be comprised in an ITE unit or in an earpiece, e.g. Receiver-in-Ear (RIE) unit or Microphone-and-Receiver-in-Ear (MaRIE) unit, of the hearing device.

The voice detector module is further configured for notifying a detection of the own voice to the processing unit if one or more of the detection criteria are satisfied. The voice detector module may be connected to the processing unit. The voice detector module and the processing unit may be further configured to operate in parallel. In other words, the processing unit may be configured for processing the first electric input signal and the second electric input signal while the voice detector unit may be configured for detecting own voice of the user of the hearing device based on one or more detection criteria. The voice detector module may be configured for recurrently detecting own voice of the user of the hearing device based on one or more detection criteria.

The voice detector module may be configured for notifying the detection of the own voice to the processing unit by sending a detection signal from the voice detector module to the processing unit. The processing unit may be configured for processing the first electric input signal and the second electric input signal in accordance with the detection signal. Thus, if own voice is detected and the processing unit has been notified of the detection of own voice, the processing of the first electric input signal and the second electric input signal may comprise additional processing, such as modifying or adapting a gain of a own voice component of the first electric input signal and the second electric input signal, such as lowering the gain of the own voice component or shaping the gain of the own voice component, etc. Thus, it is an advantage that the voice detector module may be configured for notifying the detection of own voice to the processing unit because this may provide that the processing unit may comprise or perform additional processing of the own voice component of the first electric input signal and the second electric input signal. Hereby, the user's own voice may sound more pleasant or more natural for the user. If own voice is not detected, processing of the first electric input signal and the second electric input signal may not comprise additional processing relating to the user's own voice.

In an embodiment, the hearing device may comprise one or more antenna(s) configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the hearing device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls. The one or more wireless communications unit(s) may be configured for wireless data communication, and may be coupled to the one or more antennas for emission and reception of an electromagnetic field. The one or more wireless communication units may be configured for communication using any protocol as known for a person skilled in the art, including Bluetooth, WLAN standards, manufacture specific protocols, such as tailored proximity antenna protocols, such as proprietary protocols, such as low-power wireless communication protocols, RF communication protocols, magnetic induction protocols, etc. The one or more wireless communication units may be configured for communication using same communication protocols, or same type of communication protocols, or the one or more wireless communication units may be configured for communication using different communication protocols.

In an embodiment, the wireless signal may originate from one or more external source(s) and/or external devices, such as spouse microphone device(s), wireless audio transmitter (s), smart computer(s) and/or distributed microphone array (s) associated with a wireless transmitter. The wireless input signal(s) may origin from another hearing device, e.g., as part of a binaural or bilateral hearing device system and/or from one or more accessory device(s), such as a smartphone and/or a smart watch.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the hearing device may comprise a digital-to-analogue converter configured to convert the first electric output signal, the second electric output signal and/or the wireless output signal into an analogue signal.

In an embodiment, the hearing device may comprise a vent. A vent is a physical passageway such as a canal or tube primarily placed to offer pressure equalization across a housing placed in the ear such as an ITE hearing device, an ITE unit of a BTE hearing device, a CIC hearing device, a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the hearing device may comprise a memory, including volatile and non-volatile forms of memory.

According to an aspect, disclosed is a method at a hearing device according to the present disclosure. The method comprises detecting if the own voice of the user of the hearing device is present in the first electric input signal based on the one or more detection criteria. Alternatively or additionally, the method comprises detecting if the own voice of the user of the hearing device is present in the second electric input signal based on the one or more detection criteria. Alternatively or additionally, the method comprises detecting if the own voice of the user of the hearing device is present in a third electric input signal based on the one or more detection criteria. The method comprises, in response to a detection of own voice, providing a detection signal from the voice detector module to the processing unit.

According to an aspect, disclosed is a bilateral hearing device system. The bilateral hearing device system comprises an first hearing device and a second hearing device. The first hearing device is a hearing device according to the present disclosure. The first hearing device further comprises a first wireless communication interface. The second hearing device comprises a second wireless communication interface. The second hearing device comprises a fourth input transducer configured for providing a fourth electric input signal. The first hearing device is configured for receiving the fourth electric input signal from the second hearing device via the second wireless communication interface and the first wireless communication interface. The first hearing device further comprises a fourth band-pass filter configured for band-pass filtering the fourth electric input signal received from the second hearing device. Alternatively, the second hearing device may comprise the fourth band-pass filter configured for band-pass filtering the fourth electric input signal. The first hearing device may then be configured for receiving the band-pass filtered fourth electric input signal from the second hearing device via the second wireless communication interface and the first wireless communication interface. The voice detector of the first hearing device further comprises a transmission delay filter configured to transmission delay the band-pass filtered first electric signal to provide a transmission delayed band-pass filtered first electric input signal. The voice detector of the first hearing device further comprises a fourth adaptive filter configured for filtering the transmission delayed band-pass filtered first electric input signal. The fourth adaptive filter is configured for minimizing an error signal of subtracting the transmission delayed band-pass filtered first electric input signal from the band-pass filtered fourth electric input signal. A sixth detection criterion of the one or more detection criteria is a bilateral direction of arrival criterion. A bilateral direction of arrival estimate is provided by the fourth adaptive filter. The voice detector further comprises a fifth attack-and-release filter configured for filtering the bilateral direction of arrival estimate.

The bilateral hearing device system comprises the first hearing device and the second hearing device. The first hearing device is a hearing device according to the present disclosure. The second hearing device may be similar to the first hearing device. The second hearing device may be identical to the first hearing device. The second hearing device may be different from the first hearing device.

The first hearing device further comprises the first wireless communication interface. The second hearing device comprises the second wireless communication interface. The first and second wireless communication interfaces may each comprise one or more antenna(s) and one or more wireless communication unit(s), the antenna and wireless communication unit as described above. For example, the first and second wireless communication interfaces may each comprise an electric antenna and/or a magnetic antenna, the electric antenna and magnetic antenna as described above. The first and second wireless communication interfaces may be configured for wireless communication between the first and the second hearing devices and/or from one or more accessory device(s), such as a smartphone and/or a smart watch.

The second hearing device comprises the fourth input transducer configured for providing the fourth electric input signal. The first hearing device is configured for receiving the fourth electric input signal from the second hearing device via the second wireless communication interface and the first wireless communication interface. The fourth input transducer may comprise one or more microphones. The fourth input transducer may be configured for converting an acoustic signal into the fourth electric input signal. The fourth electric input signal may be an analogue signal. The fourth electric input signal may be a digital signal. The fourth input transducer may be coupled to one or more analogue-to-digital converter configured for converting the analogue fourth input signal into a digital fourth input signal.

The first hearing device further comprises the fourth band-pass filter configured for band-pass filtering the fourth electric input signal received from the second hearing device. Alternatively, the second hearing device may comprise the fourth band-pass filter configured for band-pass filtering the fourth electric input signal. The fourth band-pass filter may be similar to the first and second band-pass filters described above.

The voice detector of the first hearing device further comprises the transmission delay filter configured to transmission delay the band-pass filtered first electric signal to provide a transmission delayed band-pass filtered first electric input signal. The transmission delay filter may be configured to delay the band-pass filtered first electric input signal with a delay equal to the time it takes to receive the fourth electric input signal, or the band-pass filtered fourth electric input signal, from the second hearing device. In other words, the transmission delay filter may be configured for bringing the band-passed filtered first electric input signal into phase with the band-pass filtered fourth electric input signal for a sound source from a 0 degree azimuth, that is a sound source originating from a front of a user, such as corresponding to e.g. own voice or a far field signal in front of the user, that is at 0 degree azimuth.

The voice detector of the first hearing device further comprises a fourth adaptive filter configured for filtering the transmission delayed band-pass filtered first electric input signal. The fourth adaptive filter is configured for minimizing an error signal of subtracting the transmission delayed band-pass filtered first electric input signal from the band-pass filtered fourth electric input signal.

A sixth detection criterion of the one or more detection criteria is a bilateral direction of arrival criterion. In some embodiments, the sixth detection criterion of the one or more detection criteria may be the only applied detection criteria. In some embodiments, the voice detector module is configured for detecting own voice of a user of the hearing device based on one detection criterion, the one detection criterion being the sixth detection criterion, that is the bilateral direction of arrival criterion.

A bilateral direction of arrival estimate is provided by the fourth adaptive filter.

The voice detector further comprises a fifth attack-and-release filter configured for filtering the bilateral direction of arrival estimate.

In some embodiments, the fourth adaptive filter, denoted K, may for example be a FIR filter, an IIR filter, or similar.

In some embodiments, the fourth adaptive filter may be a single tap FIR filter. In that case the fourth adaptive filter, K, may be given as:

$$K_{instant}(k) = \frac{\sum_{i=0}^{B-1} r_{left}(k-i) * r_{right}(k-i)}{\max\left(\sum_{i=0}^{B-1} r_{left}(k-i)^2, \sum_{i=0}^{B-1} r_{right}(k-i)^2\right)}$$

where k denotes a sample time, $r_{left}$ the transmission delayed band-pass filtered first electric input signal, $r_{right}$ the band-pass filtered fourth electric input signal and $K_{instant}$ is calculated at every B samples where B denotes a block length (e.g. 8 samples, e.g. 16 samples, e.g. 32 samples, e.g. 64 samples, etc.). It is seen that for the present embodiment, for signals having a close to similar magnitude and phase on the first input transducer and the fourth input transducer, the fourth adaptive filter K will have a value close to 1.

In some embodiments, the fourth adaptive filter may be selected to have a value close to 1 when signals on the first input transducer and the fourth input transducer have a substantially similar magnitude and phase, such as when the magnitude and phase of the signals corresponds. Thus, for example when the transmission delayed band-pass filtered first electric input signal stemming from the first input transducer of the first hearing device and the fourth electric input signal stemming from the fourth input transducer of the second hearing device have close to similar magnitude and phase, the fourth adaptive filter K will have a value close to 1, such as between 0.9 and 1. For example when the transmission delayed band-pass filtered first electric input signal stemming from the first input transducer of the first hearing device and the fourth electric input signal stemming from the fourth input transducer of the second hearing device have close to similar magnitude and phase, this may correspond to e.g. own voice or a far field signal from 0 degrees or 180 degrees azimuth. For transmission delayed band-pass filtered first electric input signal and fourth electric input signals having different magnitude and phase, the fourth adaptive filter may have a value smaller than 1, such as smaller than 0.8, such as smaller than 0.6, e.g. between 0 and 0.8, such as between 0 and 0.6. Hereby, the value of the fourth adaptive filter may provide information on where the signal is coming from.

Hereby, in some embodiments, a bilateral direction of arrival estimate is provided by the fourth adaptive filter, such as based on the value of the fourth adaptive filter. The fourth adaptive filter may provide a bilateral direction of arrival estimate. In some embodiments, the bilateral direction of arrival estimate may be calculated e.g. at every B samples. The bilateral direction of arrival estimate may provide an indication or estimate that own voice is detected The sixth detection criterion of the one or more detection criteria is a bilateral direction of arrival criterion. In some embodiments, the sixth detection criteria is satisfied when the bilateral direction of arrival estimate indicates that own voice or a far field signal from either 0 degrees azimuth or 180 degrees azimuth is received.

The voice detector further comprises a fifth attack-and-release filter configured for filtering the bilateral direction of arrival estimate.

In the example set out above, the filtering, may be determined as $$K(k)=(1-\text{alpha})*K(k-B)+\text{alpha}*K_{instant}(k)$$

where $\text{alpha}=\text{alpha}_{attack}$ when $K_{instant}(k)>K(k-B)$ and $\text{alpha}=\text{alpha}_{release}$ when $K_{instant}(k)<=K(k-B)$. By using a different attack or release forgetting factor alpha for filtering and/or smoothing, the resulting value of K can be biased to zero ($\text{alpha}_{attack}<\text{alpha}_{release}$) or it can be biased to 1 ($\text{alpha}_{attack}>\text{alpha}_{release}$). In some examples, values of $\text{alpha}_{attack}$ and $\text{alpha}_{release}$ may be e.g. 0.8 and 0.2, respectively.

It is an advantage to filter the bilateral direction of arrival estimate as this may stabilize the bilateral direction of arrival estimate, that is, in the example above, the fifth attach and release filter may stabilize the output of K.

In some embodiments, the filtered bilateral direction of arrival estimate is used for providing an indication or estimate that own voice is detected. In some embodiments, the sixth detection criteria is satisfied when the filtered bilateral direction of arrival estimate indicates that own voice or a far field signal from 0 degrees azimuth or 180 degrees azimuth is received.

According to an aspect, disclosed is a method at a bilateral hearing device system according to the present disclosure. The method comprises detecting if the own voice of the user of the hearing device system is present in the first electric input signal based on the one or more detection criteria. Alternatively or additionally, the method comprises detecting if the own voice of the user of the hearing device system is present in the second electric input signal based on the one or more detection criteria. Alternatively or additionally, the method comprises detecting if the own voice of the user of the hearing device system is present in the third electric input signal based on the one or more detection criteria. The method comprises, in response to a detection of own voice, providing a detection signal from the voice detector module to the processing unit.

In some embodiments, a first detection criterion of the one or more detection criteria is a monaural direction of arrival criterion. In some embodiments, the first detection criterion of the one or more detection criteria may be the only applied detection criteria. In some embodiments, the voice detector module is configured for detecting own voice of a user of the hearing device based on one detection criterion, the one detection criterion being the first detection criterion, that is the monaural direction of arrival criterion.

In some embodiments, the voice detector further comprises a first primary filter configured for filtering the band-pass filtered first electric input signal to provide a first primary filtered signal. In some embodiments, the voice detector further comprises a first secondary filter configured for filtering the band-pass filtered second electric input signal to provide a first secondary filtered signal. The first primary filter and the first secondary filter may be further configured for providing a first directional pattern signal comprising a directional null into a direction of the own voice; for example, the first directional pattern signal may comprise a rear facing cardioid like pattern with a directional "null" at 0 degrees azimuth. Alternatively, the first primary filter and the first secondary filter may be further configured for providing a first directional pattern signal comprising a directional null into a direction of a far field signal in front of the user. The first directional pattern signal may be based on subtracting the first primary filtered signal from the first secondary filtered signal.

The first primary filter (F) may filter the band-pass filtered first electric input signal provided by the first input transducer.

The first secondary filter (D) may be a delay filter, such as an integer delay filter, and may be configured for delaying the band-pass filtered second electric input signal to provide a delayed version of the band-pass filtered second electric input.

In some embodiments, the voice detector further comprises a second primary filter configured for filtering the band-pass filtered second electric input signal to provide a second primary filtered signal. In some embodiments, the voice detector further comprises a second secondary filter configured for filtering the band-pass filtered first electric input signal to provide a second secondary filtered signal. The second primary filter and the second secondary filter may be further configured for providing a second directional pattern signal comprising a directional null opposite the direction of the own voice, for example the second directional pattern signal may comprise a front facing cardioid like pattern with a directional "null" at 180 degrees azimuth.

Alternatively, the second primary filter and the second secondary filter may be further configured for providing a second directional pattern signal comprising a directional null opposite the direction of the far field signal in front of the user. The second directional pattern signal may be based on subtracting the second primary filtered signal from the second secondary filtered signal. The second primary filter (R) may filter the band-pass filtered second electric input signal provided by the second input transducer.

The second secondary filter (D) may be an integer delay filter and may be configured for delaying the band-pass filtered first electric input signal to provide a delayed version of the band-pass filtered first electric input.

The first primary filter and the second primary filter may be any filters, such as a FIR filter, an IIR filter, or similar. In some embodiments, the first primary filter and/or the second primary filter are FIR filters with an even order.

The first secondary filter and the second secondary filter may be any delay filter, such as an integer delay filter, etc.

As is seen, in some embodiments, a cross correlation between the first electric input signal of the first input transducer and the second electric input signal of the second input transducer, is performed.

In some embodiments, the voice detector module further comprises a first adaptive filter configured for filtering the second directional pattern signal. The first adaptive filter may be further configured for minimizing an error signal of subtracting the first directional pattern signal from the second directional pattern signal filtered by the first adaptive filter. In some embodiments, the first adaptive filter may be configured for minimizing an output of the first directional pattern signal subtracted from the second directional pattern signal filtered by the first adaptive filter.

In some embodiments, a monaural direction of arrival estimate is provided by the first adaptive filter. The monaural direction of arrival estimate may provide an indication or estimate that own voice is detected.

The first detection criterion of the one or more detection criteria is a monaural direction of arrival criterion. In some embodiments, the first detection criteria is satisfied when the monaural direction of arrival estimate indicates that own voice is received. In some embodiments, the monaural direction of arrival estimate may have a value within a specified range that corresponds to own voice location. Such specified range may correspond to e.g. the typical values of the monaural direction of arrival estimate for a source emanating from the mouth of the user.

In some embodiments, the voice detector further comprises a first attack-and-release filter configured for filtering the monaural direction of arrival estimate.

In some embodiments, the first adaptive filter may be a single coefficient adaptive filter.

In some embodiments, the monaural direction of arrival estimate may be given by the first adaptive filter:

$$G_{instant}(k) = \frac{\sum_{i=0}^{B-1} u(k-i) * v(k-i)}{\sum_{i=0}^{B-1} u(k-i)^2},$$

where k denotes the sample time, u the second directional pattern signal, possibly adjusted by a front preference coefficient $\alpha_{FPR}$, V the first directional pattern signal, and $G_{instant}$ may be calculated at every B samples where B denotes the block length (e.g. 8 samples, e.g. 16 samples, e.g. 32 samples, e.g. 64 samples, etc.). The coefficient $\alpha_{FPR}$ may be selected to be a value between 0 and 1, and the coefficient may be used to select the sensitivity of the monaural direction of arrival estimate by adjusting the second directional pattern signal with $1-\alpha_{FPR}$.

The monaural direction of arrival estimate provided by the first adaptive filter may be smoothed by using the first attack and release filter. Such as by using the first attack and release filter calculated at every B samples as $$G(k)=(1-\text{alpha})*G(k-B)+\text{alpha}*G_{instant}(k)$$

where alpha=$\text{alpha}_{attack}$ when $G_{instant}$ (k)>G(k−B) and alpha=$\text{alpha}_{release}$ when $G_{instant}$(k)<=G(k−B). By using a different attack or release time constant for the smoothing, the resulting value of the monaural direction of arrival estimate can be biased to zero ($\text{alpha}_{attack}<\text{alpha}_{release}$) or it can be biased to 1 ($\text{alpha}_{attack}>\text{alpha}_{release}$). In some embodiments, values of $\text{alpha}_{attack}$ and $\text{alpha}_{release}$ may be selected as e.g. a value above 0.8. such as above 0.9, such as above 0.95, etc., such as e.g. a value of 0.8, such as a value of 0.9, etc., and a value below 0.2, such as below 0.1, such as below 0.05, etc., such as e.g. a value of 0.2, such as 0.1, such as 0.05, etc., respectively.

It is an advantage to provide the first attack and release filter configured to smooth the monaural direction of arrival estimate provided by the first adaptive filter, as the first attack and release filter may thus stabilize the monaural direction of arrival estimate as provided by the first adaptive filter. It is an additional advantage that by using a different attack or release time constant for first attack and release filter configured to smoothing the monaural direction of arrival estimate provided by the first adaptive filter, the monaural direction of arrival estimate of the first adaptive filter, such as a resulting value of the first adaptive filter, may be biased to zero or one, depending on the relationship between the first directional pattern signal and the second directional pattern signal.

The monaural direction of arrival estimate may have a value within a specified range that corresponds to the own voice location. This specified range may correspond to e.g. the typical values of the monaural direction of arrival estimate for a source emanating from the mouth of the user, such a range around zero, such as a range from 0 to 0.2. Thus, the resulting value of the output of the first adaptive filter may be used to extract the monaural direction of arrival estimate of the signal. In some embodiments, e.g. when the value of the first adaptive filter is close to zero, the dominant sound is determined to originate from a location with a similar transfer to the microphones as from the mouth.

In some embodiments, the monaural direction of arrival estimate may be low-pass filtered to stabilize its output. In some embodiments, the monaural direction of arrival estimate may be filtered using an attack and release filter allowing for a different attack time constant (when the value gets lower than a current value) and release time constant (when the value gets bigger than a current value), to bias the monaural direction of arrival estimate to zero or one.

In some embodiments, the filtered monaural direction of arrival estimate is used for providing an indication or estimate that own voice is detected. In some embodiments, the first detection criteria is satisfied when the filtered monaural direction of arrival estimate indicates that own voice is received.

In some embodiments, a second detection criterion of the one or more detection criteria is a first power level difference criterion. A first power level difference estimate may be provided by comparing a power level of the band-pass filtered first electric input signal and a power level of the band-pass filtered second electric input signal. In some embodiments, the voice detector further comprises a second attack-and-release filter configured for filtering the first power level difference estimate.

The first power level difference estimate may provide an indication or estimate that own voice is detected.

The second detection criterion of the one or more detection criteria is a first power level difference criterion. It is an advantage of detecting a first power level difference estimate, or a filtered first power level difference estimate, as the power level difference between the first input transducer and the second input transducer typically falls within a predetermined range when own voice is detected. In some embodiments, the second detection criteria is satisfied when the first power level difference estimate or the filtered first power level difference estimate indicates that own voice is received, for example when the power level difference between the first input transducer and the second input transducer are above a threshold $H_{lowBound}$ and below a threshold $H_{highBound}$, i.e. within a specified range.

In some embodiments, the power level may be compared using:

$$H_{instant}(k) = \frac{\sum_{i=0}^{B-1} W_{front}(k-i)^2 - \sum_{i=0}^{B-1} W_{rear}(k-i)^2}{\max\left(\sum_{i=0}^{B-1} W_{front}(k-i)^2, \sum_{i=0}^{B-1} W_{rear}(k-i)^2\right)}$$

where k denotes the sample time, $w_{front}$ is the power level of the band-pass filtered first electric input signal, $w_{rear}$ is the power level of the band-pass filtered second electric input signal, and $H_{instant}$ is calculated at every B samples where B denotes the block length (e.g. 8 samples, e.g. 16 samples, e.g. 32 samples, e.g. 64 samples, etc.).

The first power level difference estimate may be filtered and/or smoothed by using the second attack and release filter, the second attack and release filter may be implemented as the above discussed first attack and release filter.

The filtered first power level difference estimate may be configured to be in a range between $H_{lowBound}$ and $H_{highBound}$ for an own voice signal. In some examples, the values of $H_{lowBound}$ and $H_{highBound}$ could be 0 and 1, respectively. In some examples values of the $H_{lowBound}$ and $H_{highBound}$ could e.g. be predetermined. In some examples, the $H_{lowBound}$ and $H_{highBound}$ could be predetermined by measuring a filtered first power level difference for a source emanating from the mouth of a Kemar head for an average ear (or a set of ears) using off-line measurements with the particular form-factor. Additionally or alternatively, values of the $H_{lowBound}$ and $H_{highBound}$ may be calibrated by using one or more training sessions, e.g. by having the wearer talk for a few seconds while monitoring the extremes (maximum and minimum value) of the filtered first power level difference.

In some embodiments, a third detection criterion of the one or more detection criteria is a first own voice activity indicator criterion.

In some embodiments, the voice detector further comprises a third primary filter configured for filtering the band-pass filtered first electric input signal to provide a third primary filtered signal. In some embodiments, the voice detector further comprises a third secondary filter configured for filtering the band-pass filtered second electric input signal to provide a third secondary filtered signal. The third primary filter and the third secondary filter may be further configured for providing a third directional pattern signal comprising a directional null into the direction of the own voice. The third directional pattern signal may be based on subtracting the third primary filtered signal from the third secondary filtered signal.

The third primary filter (P) may be used to form a directional pattern with a directional null in the direction of the own voice. The third primary filter may correspond to the first primary filter. The third primary filter may be different from the first primary filter.

In some embodiments, the hearing device is further configured for engaging in a training mode, wherein the third primary filter is further configured to be personalized to the user.

The third primary filter, which may be configured to obtain a directional pattern with a directional null in the direction of the own voice, may be any suitable filter, such as a FIR filter, an IIR filter, etc. In some embodiments, the third primary filter may be calibrated by minimizing the third directional pattern signal for a source emanating from the mouth of a Kemar head for an average ear (or set of ears) using off-line measurements with the particular form-factor. In some embodiments, the third primary filter may be calibrated (or individualized) by using a training session where the user speaks for a time period, such as a time period of a couple of seconds, such as a time period of 60 seconds, etc., while adapting the third primary filter to minimize the third directional pattern signal.

In some embodiments, the training session may be triggered from an external electronic device, e.g. such as a mobile phone, a tablet computer, a personal computer, etc. In some embodiments, the user may activate the start of the training session while being in a quiet environment, e.g. by pressing a button, or activating an affordance at the external electronic device. In some embodiments, the training session may be triggered at the hearing device, e.g. by pressing one or more buttons of the hearing device.

In some embodiments, during the training session, a dedicated algorithm may be run in the hearing device processing unit to adapt the third primary filter while the user talks. Once converged, so that the third primary filter has determined that the third directional pattern signal is minimized, the training session may end.

In some embodiments, the hearing device may signal to the external device and/or the user that the training session has ended. The third primary filter, as adapted during the training session, including any determined third primary filter values, may be stored in the hearing device. In some embodiments, the stored third primary filter may be loaded whenever the hearing device is activated.

Alternatively, in some embodiments, the hearing device may monitor the environment of the hearing device, (or any external device, such as any external device connected to the hearing device). When it is determined that the user is in a quiet environment and the own voice detection module has a very high confidence that the user is talking, the third primary filter may be adapted to ensure that the third directional pattern signal is minimized, as there is a high likelihood that the user is talking. Additionally or alternatively, any thresholds, such as e.g. $H_{lowBound}$ and $H_{highBound}$, used for detection may be similarly adapted, while there is a high likelihood that the user is talking.

In some embodiments, corrective actions may be taken, should the user not have been talking when adapting the third primary filter. For example, predetermined allowed ranges on the adapted third primary filter (and/or any thresholds) may be provided to ensure that the third primary filter is not out-of-range. Alternatively, average realization over multiple training sessions may be determined. In some examples, such averages may be update only slowly during each session.

It may be an advantage of training the third primary filter using such training sessions as the third primary filter may provide a directional pattern with a more robust determination of the directional null in the direction of the own voice. Thus, the training sessions may improve a detection of own voice in more challenging environments soundwise.

In some embodiments, the voice detector further comprises a fourth primary filter configured for filtering the band-pass filtered second electric input signal to provide a fourth primary filtered signal. In some embodiments, the voice detector further comprises a fourth secondary filter configured for filtering the band-pass filtered first electric input signal to provide a fourth secondary filtered signal. The fourth primary filter and the fourth secondary filter may be further configured for providing a fourth directional pattern signal comprising a directional null into a direction of a far field source, such as for example at 0 degree azimuth and −20 degrees elevations. Thus, the fourth primary filter may suppress far field sources approximately from the directions of the own voice signal. The fourth directional pattern signal may be based on subtracting the fourth primary filtered signal from the fourth secondary filtered signal.

It is seen that in some embodiments, the third primary filter may be configured to have a directional pattern with a directional null in the direction of the own voice, that is at a near field source at 0 degree azimuth and −20 degrees elevation, so that any own voice signal will be significantly suppressed, while the fourth primary filter may be configured or calibrated to have a directional pattern with a directional null in the direction of the own voice, that is at a far field source of 0 degree azimuth and −20 degrees elevation. The fourth primary filter may pass some of the user's own voice as the fourth primary filter is configured or calibrated to have a zero at a far field source.

The fourth primary filter may correspond to the second primary filter. The fourth primary filter may be different from the second primary filter.

In some embodiments, the voice detector further comprises a second adaptive filter configured for filtering the fourth directional pattern signal. The second adaptive filter may be further configured for minimizing an error signal of subtracting the third directional pattern signal from the fourth directional pattern signal filtered by the second adaptive filter.

In some embodiments, a own voice activity indicator estimate is provided by the second adaptive filter. In some embodiments, the voice detector further comprises a third attack-and-release filter configured for filtering the own voice activity indicator estimate.

The own voice activity indicator estimate may be provided by the second adaptive filter:

$$T_{instant}(k) = \frac{\Sigma_{i=0}^{B-1} s(k-i)^2}{\Sigma_{i=0}^{B-1} m(k-i) * s(k-i)}$$

where k denotes the sample time, s is the fourth directional pattern signal, m is the third directional pattern signal and $T_{instant}$ is calculated at every B samples where B denotes the block length (e.g. 8 samples, e.g. 16 samples, e.g. 32 samples, e.g. 64 samples, etc.).

Alternatively, $T_{instant}$ can be calculated as follows:

$$T_{instant}(k) = \frac{\Sigma_{i=0}^{B-1} s(k-i)^2}{\Sigma_{i=0}^{B-1} m(k-i)^2},$$

The second adaptive filter (T) at time k may be obtained in a similar way as the first adaptive filter as set out above, by using the third attack and release filter for filtering the first own voice activity indicator estimate.

In some embodiments, an upper bound $T_{maxFf}$ is determined corresponding to a largest value that the filtered first own voice activity indicator estimate T(k) may reach for a far field signal from any direction.

In some embodiments, a value of the filtered first own voice activity indicator estimate may be measured for far field signals in e.g. an anechoic room on an average ear (or set of ears), or additionally or alternatively simulate this by using room impulse responses to each of the input transducers for a particular form factor of the first own voice activity indicator estimate being used.

In some embodiments, the value of the filtered first own voice activity indicator estimate T(k) may become bigger than the threshold $T_{maxFf}$. In some embodiments T(k) $>T_{maxFf}$, may indicate either that an own voice signal is present, or it may indicate that some other near field signal (e.g. contact noise or wind noise etc.) is present.

In some embodiments, the first own voice activity indicator estimate or the filtered first own voice activity indicator estimate may provide an indication or estimate that own voice is detected.

In some embodiments, the third detection criterion of the one or more detection criteria is a first own voice activity indicator criterion. In some embodiments, the third detection criterion is satisfied when the first own voice activity indicator estimate or the filtered first own voice activity indicator estimate indicates or estimates that own voice, or another near filed signal, is present.

In some embodiments, the hearing device comprises a Behind-the-Ear (BTE) unit. The BTE unit may comprise the first input transducer and the second input transducer. In some embodiments, the hearing device further comprises a third input transducer configured for providing a third electric input signal. The third input transducer may be an In-the-Ear (ITE) input transducer. The hearing device may further comprise an In-the-Ear (ITE) unit comprising the third input transducer. The voice detector module may be further configured for processing the third electric input signal. In some embodiments, the voice detector module further comprises a third band-pass filter configured to band-pass filter the third electric input signal. The processing unit may be further configured for processing the third electric input signal. The first electric output signal may be further based on the third electric input signal.

The first input transducer may be a front input transducer of the BTE or ITE unit. The second input transducer may be a rear input transducer of the BTE unit or ITE unit. In other words, the first and second input transducers may be provided in the BTE unit, such that the first input transducer may be provided closer to the nose or eyes (or mouth) of the user than the second input transducer, when the hearing device or the BTE unit is provided in its operational position in, on, over and/or at the user's ear. Likewise, the first and second input transducers may be provided in the ITE unit, for example at a faceplate of an ITE unit, such that the first input transducer may be provided closer to the nose or eyes (or mouth) of the user than the second input transducer, when the hearing device or the ITE unit is provided in its operational position in, on, over and/or at the user's ear.

The third input transducer may comprise one or more microphones. The third input transducer may be configured for converting an acoustic signal into the third electric input signal. The third electric input signal may be an analogue signal. The third electric input signal may be a digital signal. The third input transducer may be coupled to one or more analogue-to-digital converter(s) configured for converting the analogue third input signal into a digital third signal. The third input transducer may be comprised in an ITE unit or in an earpiece. The third input transducer may pick-up acoustic signals from around and/or inside an ear canal of the user's ear.

In some embodiments, a fourth detection criterion of the one or more detection criteria is a second power level difference criterion. A second power level difference estimate may be provided by comparing a power level of the band-pass filtered first electric input signal and a power level of the band-pass filtered third electric input signal. In some embodiments, the voice detector further comprises a fourth attack-and-release filter configured for filtering the second power level difference estimate.

The second power level difference estimate may be given by:

$$H_{instant}(k) = \frac{\sum_{i=0}^{B-1} W_{mie}(k-i)^2 - \sum_{i=0}^{B-1} W_{front}(k-i)^2}{\max\left(\sum_{i=0}^{B-1} W_{mie}(k-i)^2, \sum_{i=0}^{B-1} W_{front}(k-i)^2\right)}$$

where k denotes the sample time, $w_{mie}$ is the power level of the band-pass filtered third electric input signal, $w_{front}$ the power level of the band-pass filtered first electric input signal, and $H_{instant}$ is calculated at every B samples where B denotes the block length (e.g. 8 samples, e.g. 16 samples, e.g. 32 samples, e.g. 64 samples, etc.). Alternatively, $H_{instant}$ may be calculated based on $w_{mie}$ and $w_{rear}$, $w_{rear}$ being the power level of the band-pass filtered second electric input signal.

The second power level difference estimate may be filtered and/or smoothed by using the fourth attack and release filter, the fourth attack and release filter may be implemented as the above discussed first and/or second attack and release filter.

The filtered second power level difference estimate may be configured to be in a range between $H_{lowBound}$ and $H_{highBound}$ for an own voice signal. In some examples, the values of $H_{lowBound}$ and $H_{highBound}$ could be 0 and 1, respectively. In some examples values of the $H_{lowBound}$ and $H_{highBound}$ could e.g. be predetermined. In some examples, the $H_{lowBound}$ and $H_{highBound}$ could be predetermined by measuring a filtered second power level difference for a source emanating from the mouth of a Kemar head for an average ear (or a set of ears) using off-line measurements with the particular form-factor. Additionally or alternatively, values of the $H_{lowBound}$ and $H_{highBound}$ may be calibrated by using training sessions as discussed above, e.g. by having the wearer talk for a few seconds while monitoring the extremes (maximum and minimum value) of the filtered second power level difference.

The second power level difference estimate may provide an indication or estimate that own voice is detected The fourth detection criterion of the one or more detection criteria is a second power level difference criterion. In some embodiments, the fourth detection criteria is satisfied when the second power level difference estimate or the filtered second power level difference estimate indicates that own voice is detected. In some embodiments, the fourth detection criteria is satisfied if the filtered second power level difference estimate is within a predetermined range, such as in a range between $H_{lowBound}$ and $H_{highBound}$ for an own voice signal.

In some embodiments, a fifth detection criterion of the one or more detection criteria is a second own voice activity indicator criterion.

In some embodiments, the voice detector module comprises a third input transducer configured for providing a third electric input signal, a third band-pass filter and further comprises a third adaptive filter configured for filtering the band-pass filtered third electric input signal. In some embodiments, the voice detector further comprises a fifth secondary filter configured for filtering the band-pass filtered first electric input signal to provide a fifth secondary filtered signal. The fifth secondary filter may be a delay filter. The third adaptive filter may be configured for minimizing an error signal of subtracting the fifth secondary filtered signal from the band-pass filtered third electric input signal filtered by the third adaptive filter. The same applies mutatis mutandis when replacing the first input transducer with the second input transducer.

The second own voice activity indicator criterion may provide an indication or estimate that own voice is detected.

The fifth detection criterion of the one or more detection criteria is a second own voice activity indicator criterion. In some embodiments, the fifth detection criteria is satisfied when the second own voice activity criterion indicates that own voice is received, that is for example when the cross correlation properties of the fifth secondary filtered signal and the band-pass filtered third electric input signal filtered by the third adaptive filter, such as e.g. a filter value of the third adaptive filter, indicate that an estimated propagation time between the third input transducer and the first input transducer corresponds to or is within a range of the expected propagation time for own voice.

It is an advantage of filtering the bilateral direction of arrival estimate as this may stabilize the bilateral direction of arrival estimate, that is, in the example above, the fifth attach and release filter may stabilize the output of K.

In some embodiments, the filtered bilateral direction of arrival estimate is used for providing an indication or estimate that own voice is detected. In some embodiments, the fifth detection criteria is satisfied when the filtered bilateral direction of arrival estimate indicates that own voice or a far field signal from 0 degree azimuth or 180 degrees azimuth is received.

The present disclosure relates to different aspects including the hearing device, the bilateral hearing device system, the method of operating the hearing device and the method of operating the bilateral hearing device system above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

Throughout the present disclosure the terms "first", "second", "primary", "secondary", etc. are used here and elsewhere for labelling purposes only and are not intended to denote any specific spatial or temporal ordering, but are included to identify individual elements. Throughout the present disclosure the terms "first", "second", "primary", "secondary", etc. does not necessarily indicate any timing and/or prioritizing of the respective events or steps.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1A:
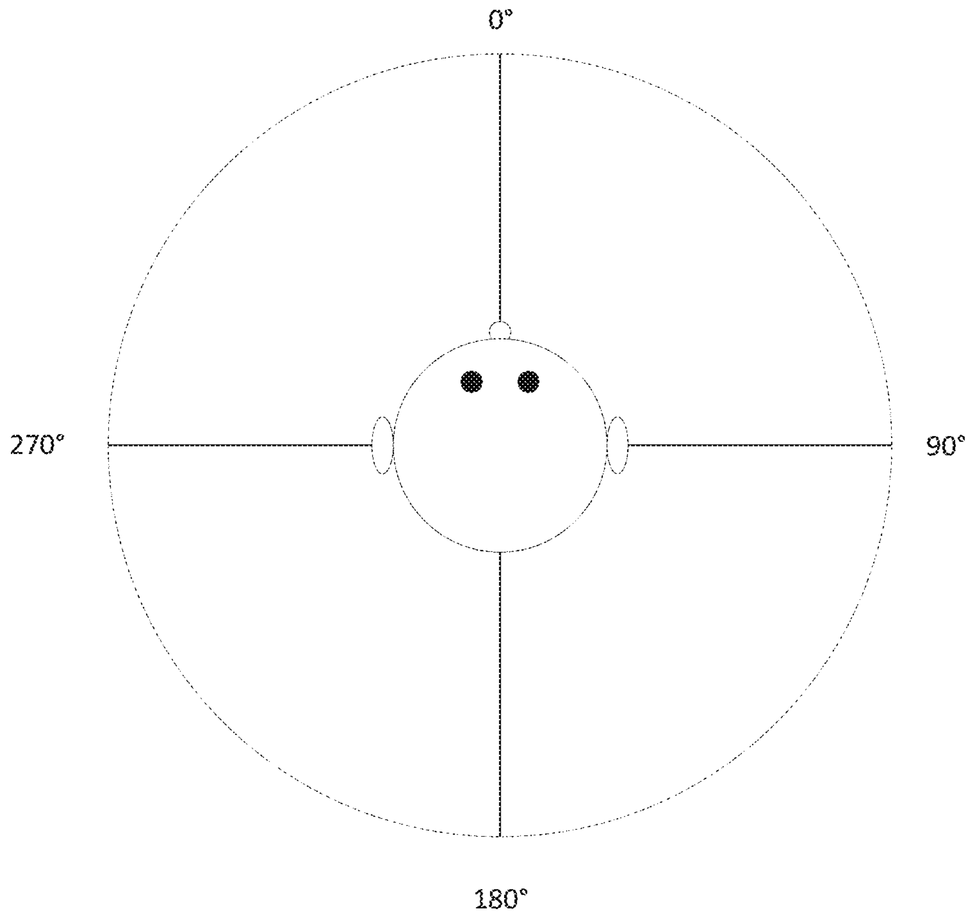
FIGS. 1*a* and 1*b* schematically illustrate a head of a user and corresponding azimuth directions and elevations.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1B:
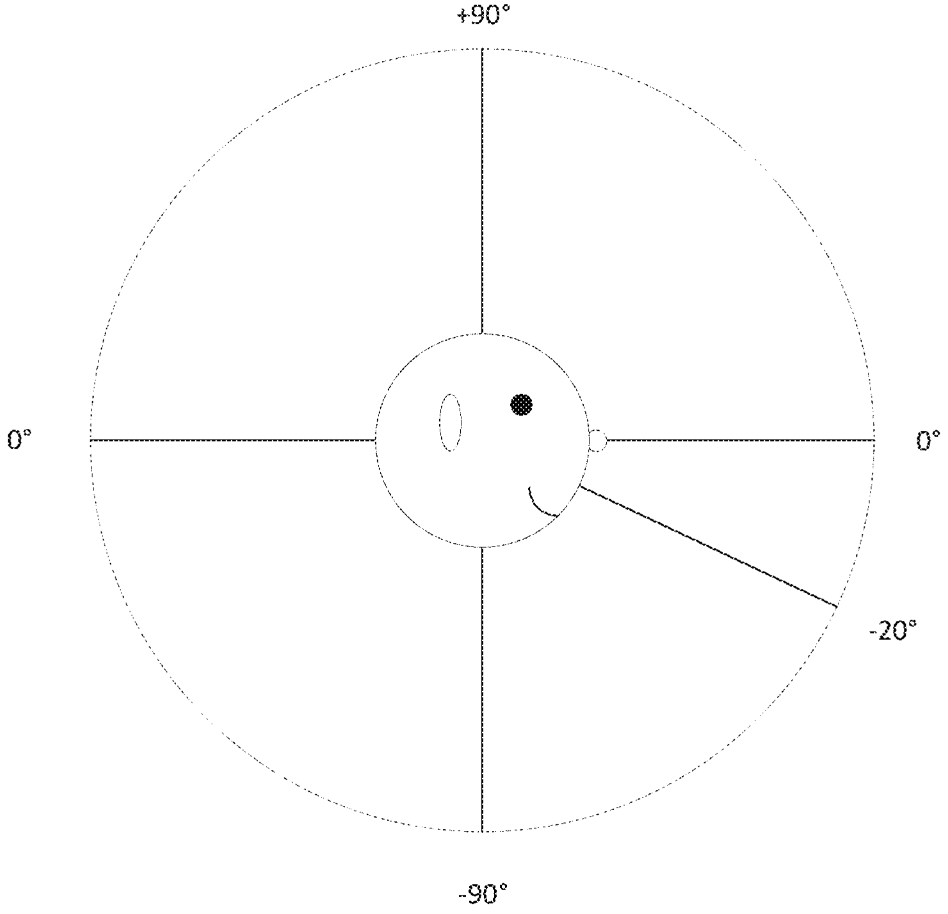

FIGS. 1*a* and 1*b* schematically illustrate a head of a user and corresponding azimuth directions and elevations.

A direction of a sound source may be specified in terms of azimuth (an angle of direction on a horizontal plane) and elevation (an angle of direction on a median plane) from the user's perspective. A sound with zero degrees azimuth and zero degrees elevation comes from straight ahead. A sound with 90 degrees azimuth and 45 degrees elevation comes from the upper left, etc. A user's own voice may typically have 0 degrees azimuth and −20 degrees elevation.

FIG. 1*a* schematically illustrates azimuth directions relative to a user. FIG. 1*a* illustrates that a direction of a sound source may be specified in terms of azimuth (an angle of direction on a horizontal plane) from a user's perspective. The figure shows a user facing zero degrees azimuth. A sound with zero degrees azimuth comes from straight ahead, while a sound with 180 degrees azimuth comes from straight behind. A sound with 90 or 270 degrees azimuth comes from the sides. A user's own voice may typically have 0 degrees azimuth and −20 degrees elevation (see FIG. 1*b* for elevation).

FIG. 1*b* schematically illustrates elevation relative to a user. FIG. 1*b* schematically illustrates that a direction of a sound source may be specified in terms of elevation (an angle of direction on a median plane) from the user's perspective. A sound with zero degrees elevation comes from straight ahead. A sound with +90 degrees elevation comes from straight up, while a sound with −90 degrees elevation comes from straight down. A user's own voice may typically have 0 degrees azimuth and −20 degrees elevation (see FIG. 1*a* for azimuth).

Figure 1C:
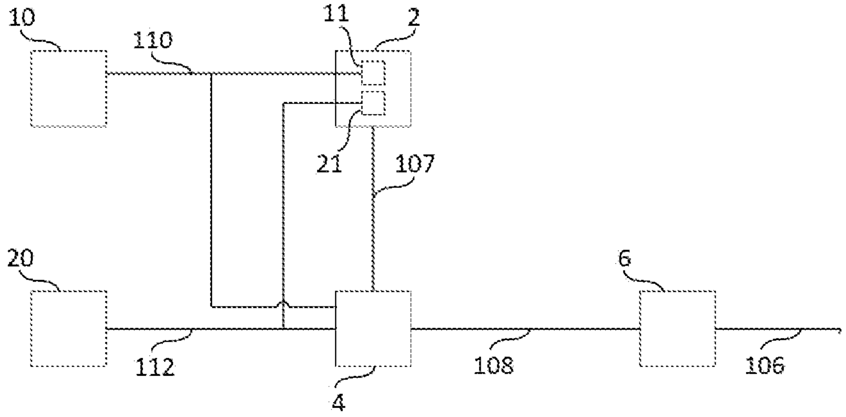
FIG. 1*c* schematically illustrates a hearing device according to the present disclosure.

FIG. 1*c* schematically illustrates a hearing device 1 comprising a first input transducer 10 configured for providing a first electric input signal 110 and a second input transducer 20 configured for providing a second electric input signal 112. The hearing device 1 comprises a voice detector module 2 configured for processing the first electric input signal 110 and the second electric input signal 112. The voice detector module 2 is configured for detecting own voice of a user of the hearing device 1 based on one or more detection criteria. The hearing device 1 comprises a processing unit 4 configured for processing the first electric input signal 110 and the second electric input signal 112. The processing unit 4 is configured for providing a first electric output signal 108 based on the first electric input signal 110 and the second electric input signal 112. The hearing device 1 comprises an output transducer 6 configured for converting the first electric output signal 108 into an acoustic output signal 106. The voice detector module 2 is further configured for notifying via notifying signal 107, a detection of the own voice, that is presence of the own voice, to the processing unit 4 if one or more of the detection criteria are satisfied.

The first input transducer 10 may be a front input transducer of the BTE unit or ITE unit. The second input transducer 20 may be a rear input transducer of the BTE unit or ITE unit. In other words, the first and second input transducers may be provided in the BTE unit, such that the first input transducer may be provided closer to the nose or eyes (or mouth) of the user than the second input transducer, when the hearing device or the BTE unit is provided in its operational position in, on, over and/or at the user's ear. Likewise, the first and second input transducers may be provided in the ITE unit, for example at a faceplate of an ITE unit, such that the first input transducer may be provided closer to the nose or eyes (or mouth) of the user than the second input transducer, when the hearing device or the ITE unit is provided in its operational position in, on, over and/or at the user's ear.

The voice detector 2 comprises a first band-pass filter 11 configured for band-pass filtering the first electric input signal 110. The voice detector 2 comprises a second band-pass filter 21 configured for band-pass filtering the second electric input signal 112.

FIGS. 2*a-d* schematically illustrates hearing device types, as well as a bilateral hearing device, and a bilateral hearing device system.

Figure 2A:
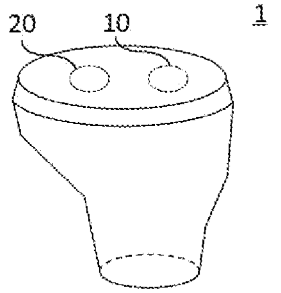
FIGS. 2*a-d* schematically illustrates hearing device types, as well as a bilateral hearing device, FIG. 3 schematically illustrates an embodiment of the present disclosure, FIG. 4. schematically illustrates a further embodiment of the present disclosure, FIG. 5 schematically illustrates yet a further embodiment of the present disclosure, FIGS. 6*a* and 6*b* schematically illustrates further embodiments of the present disclosure.

The hearing device may be an In-the-Ear (ITE) type/style hearing device, Completely-in-Canal (CIC) hearing device or Invisible-in-Canal (IIC) hearing device. FIG. 2*a* illustrates an ITE unit having a first input transducer 10 and a second input transducer 20, the first input transducer 10 being a front input transducer being located closer to the nose, eyes and mouth of the user than the second input transducer 20, being located further away from the nose, eyes and mouth of the user. The first and second input transducers 10, 20 may be located at a faceplate of the ITE unit.

Figure 2B:
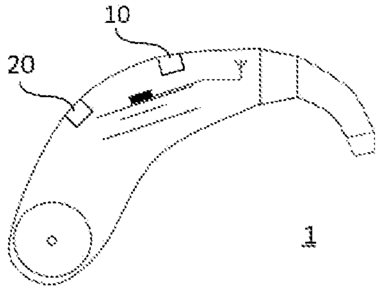

The hearing device may be a Behind-the-Ear (BTE) type/style hearing device, such as a BTE hearing device or a Receiver-in-Canal (RIC) hearing device also known as a Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. FIG. 2*b* illustrates a BTE unit having a first input transducer 10 and a second input transducer 20, the first input transducer 10 being a front input transducer being located closer to the nose, eyes and mouth of the user than the second input transducer 20, being located further away from the nose, eyes and mouth of the user.

Figure 2C:
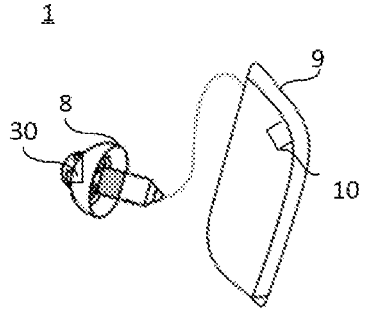

The hearing device may be a MaRIE hearing device, the MaRIE hearing device having in ITE unit comprising a third input transducer 30. The third input transducer 30 pick-up acoustic signals from around and/or inside an ear canal of the user's ear. FIG. 2*c* illustrates a BTE unit 9 having a first input transducer 10 and an ITE unit 8 comprising a third input transducer 30, the third input transducer 30 may be an In-the-Ear (ITE) input transducer. It is noted that the BTE unit 9 may additionally comprise the second input transducer.

Figure 2D:
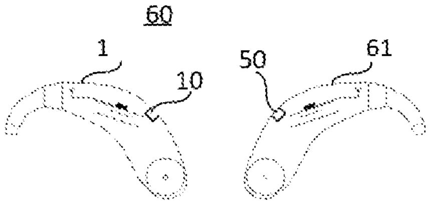

Disclosed is a bilateral hearing device system. FIG. 2*d* illustrates a bilateral hearing device system 60. The bilateral hearing device system comprises a first hearing device 1 and a second hearing device 61. The first hearing device 1 and the second hearing device 61 may be of any type. The first hearing device 1 being a hearing device according to the present disclosure. The first hearing device 1 comprises a first input transducer 10 and the second hearing device 61 comprises a fourth input transducer 50.

To establish whether own voice is present a first detection criterion of the one or more detection criteria may be a monaural direction of arrival criterion.

Figure 3:
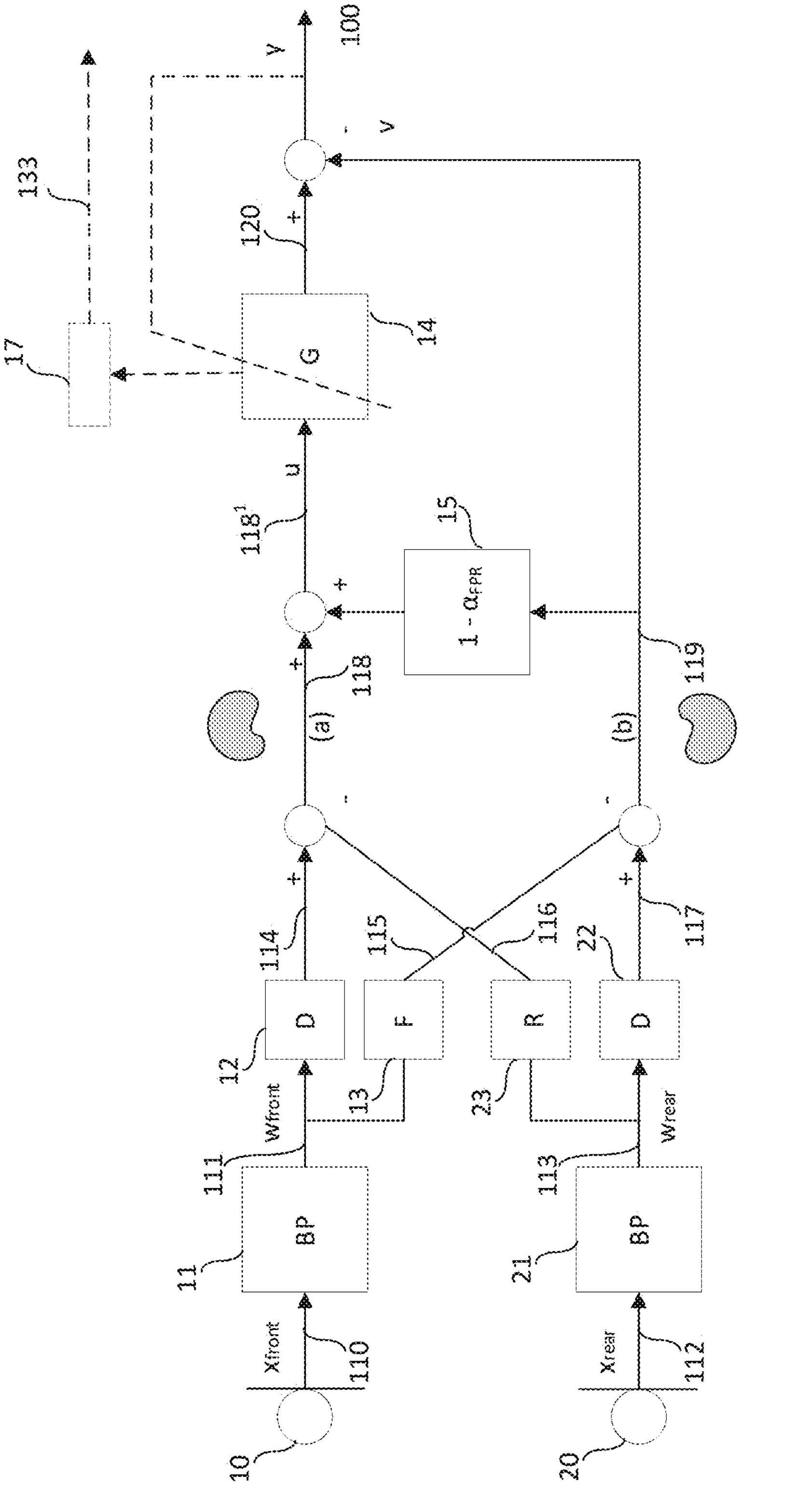

This is illustrated in FIG. 3. The voice detector comprises the first band-pass filter 11 and the second band-pass filter 21. The voice detector further comprises a first primary filter 13 configured for filtering the band-pass filtered first electric input signal 111 to provide a first primary filtered signal 115. The voice detector further comprises a first secondary filter 22 configured for filtering the band-pass filtered second electric input signal 113 to provide a first secondary filtered signal 117. The first primary filter 13 and the first secondary filter 22 may be further configured for providing a first directional pattern signal 119 comprising a directional null into a direction of the own voice; for example, the first directional pattern signal 119 may comprise a rear facing cardioid like pattern with a directional "null" at 0 degrees azimuth. Alternatively, the first primary filter and the first secondary filter may be further configured for providing a first directional pattern signal comprising a directional null into a direction of a far field signal in front of the user. The first directional pattern signal 119 may be based on subtracting the first primary filtered signal from the first secondary filtered signal.

The first primary filter 13 may filter the band-pass filtered first electric input signal provided by the first input transducer.

The first secondary filter 22 may be a delay filter, such as an integer delay filter, and may be configured for delaying the band-pass filtered second electric input signal to provide a delayed version of the band-pass filtered second electric input.

The voice detector further comprises a second primary filter 23 configured for filtering the band-pass filtered second electric input signal 113 to provide a second primary filtered signal 116. The voice detector further comprises a second secondary filter 12 configured for filtering the band-pass filtered first electric input signal 111 to provide a second secondary filtered signal 114. The second primary filter 23 and the second secondary filter 12 may be further configured for providing a second directional pattern signal 118 comprising a directional null opposite the direction of the own voice, for example the second directional pattern signal 118 may comprise a front facing cardioid like pattern with a directional "null" at 180 degrees azimuth. Alternatively, the second primary filter 23 and the second secondary filter 12 may be further configured for providing a second directional pattern signal 118 comprising a directional null opposite the direction of the far field signal in front of the user. The second directional pattern signal 118 may be based on subtracting the second primary filtered signal 116 from the second secondary filtered signal 114.

In some embodiments, the second directional pattern signal is adjusted by a front preference coefficient $\alpha_{FPR}$ 15. The second primary filter 23 may filter the band-pass filtered second electric input signal 112 provided by the second input transducer 20.

The second secondary filter 12 may be an integer delay filter and may be configured for delaying the band-pass filtered first electric input signal 111 to provide a delayed version of the band-pass filtered first electric input 111.

The first primary filter 23 and the second primary filter 13 may be any filters, such as a FIR filter, an IIR filter, or similar. In some embodiments, the first primary filter 23 and/or the second primary filter 13 are FIR filters with an even order.

The first secondary filter 12 and the second secondary filter 22 may be any delay filter, such as an integer delay filter, etc.

As is seen, in some embodiments, a cross correlation between the first electric input signal 110 of the first input transducer 10 and the second electric input signal 112 of the second input transducer 20, is performed.

The first directional pattern signal 119 may be provided at point (b) by subtracting the first secondary filtered signal 117 (that is the delayed version of the band-pass filtered second electric input signal 113 provided by the second input transducer 20) from the signal filtered by the first primary filter, i.e. the first primary filtered signal.

The voice detector module further comprises a first adaptive filter 14 configured for filtering the second directional pattern signal 118. The first adaptive filter 14 may be further configured for minimizing an error signal of subtracting the first directional pattern signal 119 from the second directional pattern signal filtered by the first adaptive filter 120. In some embodiments, the first adaptive filter 14 may be configured for minimizing an output 100 of the first directional pattern signal 119 subtracted from the second directional pattern signal filtered by the first adaptive filter 120.

In some embodiments, the second primary filter 23 may be zero, so that the second secondary filtered signal 114 is filtered by the first adaptive filter 14.

The monaural direction of arrival estimate is provided by the first adaptive filter 14. The monaural direction of arrival estimate may provide an indication or estimate that own voice is detected.

The first detection criterion of the one or more detection criteria is a monaural direction of arrival criterion. In some embodiments, the first detection criteria is satisfied when the monaural direction of arrival estimate indicates that own voice is received. In some embodiments, the monaural direction of arrival estimate may have a value within a specified range that corresponds to own voice location. Such specified range may correspond to e.g. the typical values of the monaural direction of arrival estimate for a source emanating from the mouth of the user.

The monaural direction of arrival estimate provided by the first adaptive filter may be smoothed by using a first attack and release filter 17 to provide a monaural direction of arrival estimate smoothed 133.

The second detection criterion of the one or more detection criteria may be a first power level difference criterion. A first power level difference estimate may be provided by comparing a power level $w_{front}$ of the band-pass filtered first electric input signal 111 and a power level $w_{rear}$ of the band-pass filtered second electric input signal 113. The voice detector may further comprise a second attack-and-release filter (not shown) configured for filtering the first power level difference estimate.

It is an advantage to detect a first power level difference estimate, or a filtered first power level difference estimate, as the power level difference between the first input transducer and the second input transducer typically falls within a predetermined range when own voice is detected. In some embodiments, the second detection criteria is satisfied when the first power level difference estimate or the filtered first power level difference estimate indicates that own voice is received, for example when the power level difference between the first input transducer and the second input transducer are above a threshold $H_{lowBound}$ and below a threshold $H_{highbound}$, i.e. within a specified range.

The third detection criterion of the one or more detection criteria may be a first own voice activity indicator criterion.

Figure 4:
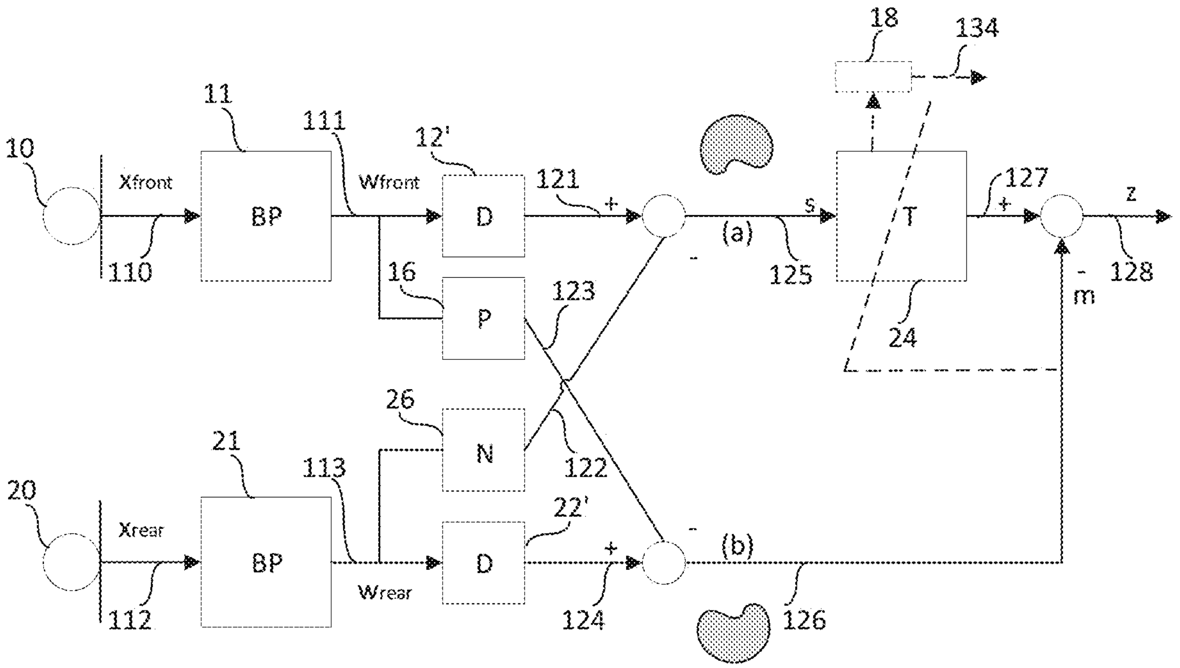

As illustrated in FIG. 4, the voice detector comprises the first band-pass filter 11 and the second band-pass filter 21. The voice detector further comprises a third primary filter 16 configured for filtering the band-pass filtered first electric input signal 111 to provide a third primary filtered signal 122. The voice detector further comprises a third secondary filter configured 22' for filtering the band-pass filtered second electric input signal 113 to provide a third secondary filtered signal 124. The third primary filter 16 and the third secondary filter 22' may be further configured for providing a third directional pattern signal 126 comprising a directional null into the direction of the own voice. The third directional pattern signal 126 may be based on subtracting the third primary filtered signal 122 from the third secondary filtered signal 124.

The third primary filter 16 may be used to form a directional pattern with a directional null in the direction of the own voice. The third primary filter 16 may correspond to the first primary filter 13. The third primary filter 16 may be different from the first primary filter 13. The third primary filter may e.g. be a FIR filter that is calibrated by minimizing the output at point (b) for a source emanating from the mouth of a Kemar head for an average ear (or a set of ears) using off-line measurements with the particular form-factor. It can also be calibrated by having the wearer talk for a few seconds and adapting the third primary filter to minimize the output at point (b).

The voice detector may further comprise a fourth primary filter 26 configured for filtering the band-pass filtered second electric input signal 113 to provide a fourth primary filtered signal 123. The voice detector further comprises a fourth secondary filter 12' configured for filtering the band-pass filtered first electric input signal 111 to provide a fourth secondary filtered signal 121. The fourth primary filter 26 and the fourth secondary filter 12' may be further configured for providing a fourth directional pattern signal 125 comprising a directional null into a direction of a far field source, such as for example at 0 degree azimuth and −20 degrees elevations. Thus, the fourth primary filter 26 may suppress far field sources approximately from the directions of the own voice signal. The fourth directional pattern signal 125 may be based on subtracting the fourth primary filtered signal 123 from the fourth secondary filtered signal 121.

It is seen that in some embodiments, the third primary filter 16 may be configured to have a directional pattern with a directional null in the direction of the own voice, that is at a near field source at 0 degree azimuth and −20 degrees elevation, so that any own voice signal will be significantly suppressed, while the fourth primary filter 26 may be configured or calibrated to have a directional pattern with a directional null in the direction of the own voice, that is at a far field source of 0 degree azimuth and −20 degrees elevation. The fourth primary filter 26 may pass some of the user's own voice as the fourth primary filter 26 is configured or calibrated to have a zero at a far field source.

The fourth primary filter 26 may correspond to the second primary filter 23. The fourth primary 26 filter may be different from the second primary filter 23.

The voice detector further comprises a second adaptive filter 24 configured for filtering the fourth directional pattern signal 125. The second adaptive filter 24 may be further configured for minimizing an error signal 128 of subtracting the third directional pattern signal 126 from the fourth directional pattern signal filtered by the second adaptive filter 127.

An own voice activity indicator estimate may be provided by the second adaptive filter 24. In some embodiments, the voice detector further comprises a third attack-and-release filter 18 configured for filtering the own voice activity indicator estimate to provide an own voice activity indicator estimate smoothed 134.

The third detection criterion of the one or more detection criteria may be a first own voice activity indicator criterion. The third detection criterion is satisfied when the first own voice activity indicator estimate or the filtered first own voice activity indicator estimate indicates or estimates that own voice, or another near filed signal, is present.

Figure 5:
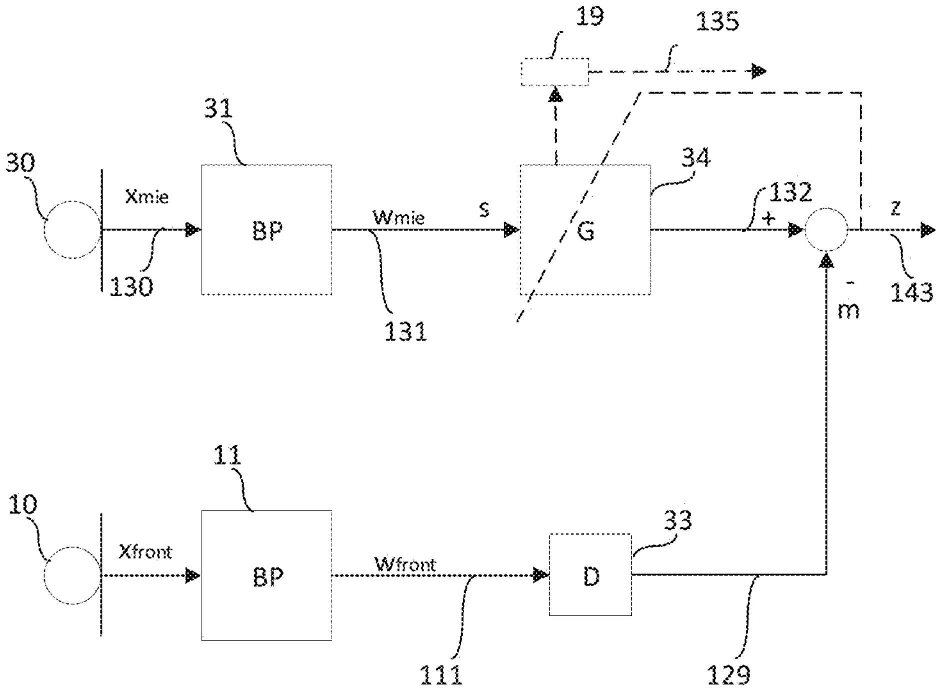

The fourth detection criterion of the one or more detection criteria may be a second power level difference criterion. A second power level difference estimate may be provided by comparing a power level $w_{front}$ of the band-pass filtered first electric input signal 111 and a power level $w_{mie}$ of the band-pass filtered third electric input signal 131 as is seen in FIG. 5. In some embodiments, the voice detector further comprises a fourth attack-and-release filter (not shown) configured for filtering the second power level difference estimate.

The filtered second power level difference estimate may be configured to be in a range between $H_{lowbound}$ and $H_{highbound}$ for an own voice signal. In some examples, the values of $H_{lowbound}$ and $H_{Highbound}$ could be 0 and 1, respectively. In some examples values of the $H_{lowbound}$ and $H_{highbound}$ could e.g. be predetermined. In some examples, the $H_{lowbound}$ and $H_{highbound}$ could be predetermined by measuring a filtered second power level difference for a source emanating from the mouth of a Kemar head for an average ear (or a set of ears) using off-line measurements with the particular form-factor. Additionally or alternatively, values of the $H_{lowBound}$ and $H_{highbound}$ may be calibrated by using training sessions as discussed above, e.g. by having the wearer talk for a few seconds while monitoring the extreme (maximum and minimum value) of the filtered second power level difference.

The second power level difference estimate may provide an indication or estimate that own voice is detected The fourth detection criteria may be satisfied if the filtered second power level difference estimate is within a predetermined range, such as in a range between $H_{lowBound}$ and $H_{highBound}$ for an own voice signal.

The fifth detection criterion of the one or more detection criteria may be a second own voice activity indicator criterion.

The voice detector module comprises a third input transducer 30 configured for providing a third electric input signal 130, a third band-pass filter 31 and further comprises a third adaptive filter 34 configured for filtering the band-pass filtered third electric input signal 131. In some embodiments, the voice detector further comprises a fifth secondary filter 33 configured for filtering, such as delaying, the band-pass filtered first electric input signal 111 to provide a fifth secondary filtered signal 129. The fifth secondary filter 33 may be a delay filter. The third adaptive filter 34 may be configured for minimizing an error signal 143 of subtracting the fifth secondary filtered signal 129 from the band-pass filtered third electric input signal filtered by the third adaptive filter, that is signal 132. The same applies mutatis mutandis when replacing the first input transducer with the second input transducer.

The second own voice activity indicator criterion may provide an indication or estimate that own voice is detected.

The fifth detection criterion of the one or more detection criteria is a second own voice activity indicator criterion. In some embodiments, the fifth detection criteria is satisfied when the second own voice activity criterion indicates that own voice is received, that is for example when the cross correlation properties of the fifth secondary filtered signal 129 and the band-pass filtered third electric input signal filtered by the third adaptive filter, that is signal 132, such as e.g. a filter value of the third adaptive filter 34, indicates that an estimated propagation time between the third input transducer 30 and the first input transducer 10 corresponds to or is within a range of the expected propagation time for own voice. An attack and release filter 19 may smooth the filter value of the third adaptive filter 34, to provide a second own voice activity indicator smoothed 135.

Figure 6A:
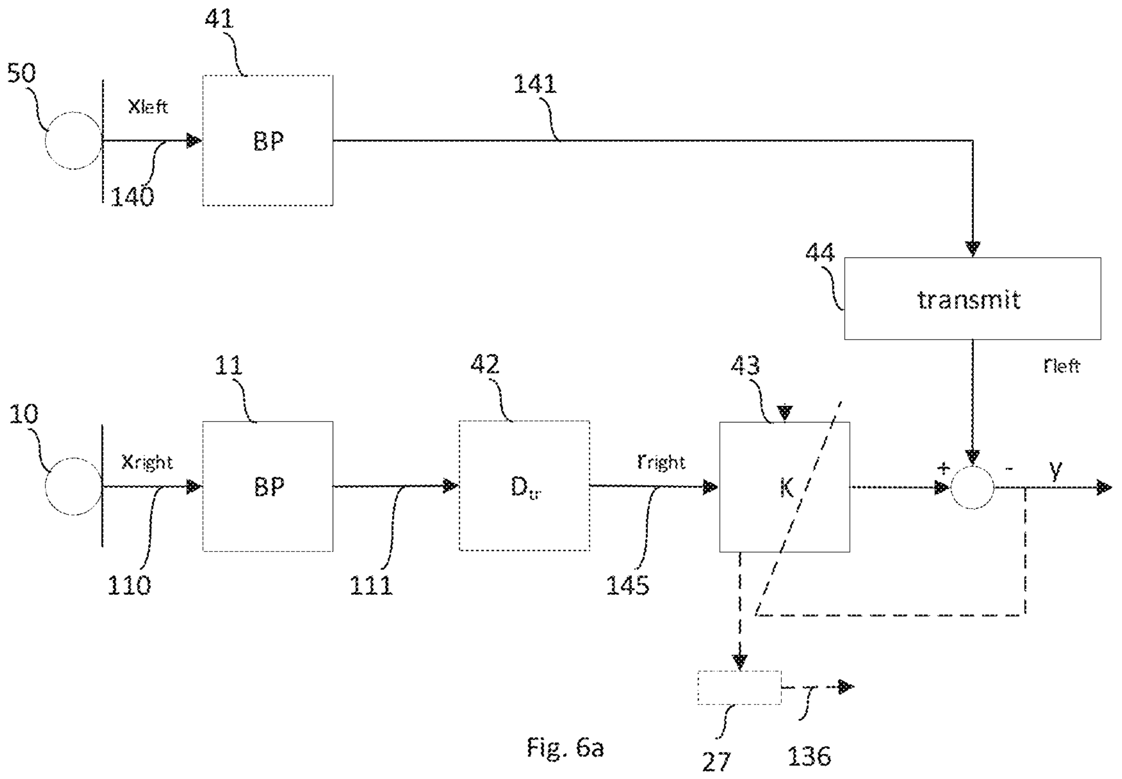
Figure 6B:
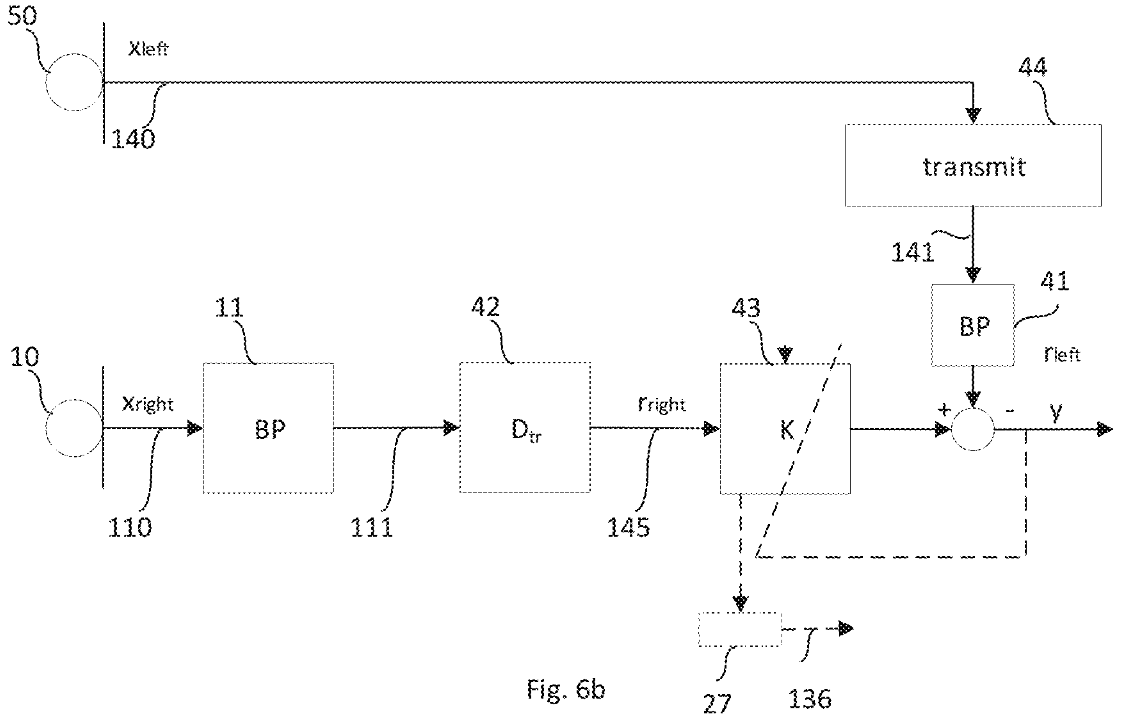

A bilateral hearing device system is disclosed in FIGS. 6*a* and 6*b* comprising a first hearing device 1 and a second hearing device 61 (see FIG. 2*d*). The first hearing device 1 is a hearing device according to the present disclosure. The second hearing device 61 comprises a fourth input transducer 50 configured for providing a fourth electric input signal 140. The first hearing device is configured for receiving the band pass filtered fourth electric input signal 141 from the second hearing device via a second wireless communication interface of the second hearing device and a first wireless communication interface of the first hearing device, that is "transmit" 44. The second hearing device 61, further comprises a fourth band-pass filter 41 configured for band-pass filtering the fourth electric input signal 140. The voice detector of the first hearing device further comprises a transmission delay filter 42 configured to transmission delay the band-pass filtered first electric signal 111 to provide a transmission delayed band-pass filtered first electric input signal 145. The voice detector of the first hearing device further comprises a fourth adaptive filter 43 configured for filtering the transmission delayed band-pass filtered first electric input signal 145. The fourth adaptive filter 43 is configured for minimizing an error signal y of subtracting the transmission delayed band-pass filtered first electric input signal 145 from the band-pass filtered fourth electric input signal 141.

A sixth detection criterion of the one or more detection criteria may be a bilateral direction of arrival criterion. A bilateral direction of arrival estimate is provided by the fourth adaptive filter 43. The voice detector may further comprise a fifth attack-and-release filter 27 configured for filtering the bilateral direction of arrival estimate to provide a bilateral direction of arrival estimate smoothed.

As seen in FIG. 6*b*, alternatively, the first hearing device 1 may comprise the fourth band-pass filter 41 configured for band-pass filtering the fourth electric input signal 140 which may be received from the second hearing device 61. The fourth band-pass filter 41 may be similar to the first, second and third band-pass filters described above.

The voice detector of the first hearing device further comprises a transmission delay filter 42 configured to transmission delay the band-pass filtered first electric signal 111 to provide a transmission delayed band-pass filtered first electric input signal 145. The transmission delay filter 42 may be configured to delay the band-pass filtered first electric input signal 111 with a delay equal to the time it takes to receive the fourth electric input signal 140 from the second hearing device. In other words, the transmission delay filter 42 may be configured for bringing the band-passed filtered first electric input signal 110 into phase with the band-pass filtered fourth electric input signal 141 for a sound source from a 0 degree azimuth, that is a sound source originating from a front of a user, such as corresponding to e.g. own voice or a far field signal in front of the user, that is at 0 degree azimuth.

The sixth detection criterion of the one or more detection criteria may be a bilateral direction of arrival criterion.

A bilateral direction of arrival estimate may be provided by the fourth adaptive filter 43.

The voice detector may further comprise a fifth attack-and-release filter 27 configured for filtering the bilateral direction of arrival estimate to provide a bilateral direction of arrival estimate smoothed 136.

In some embodiments, the fourth adaptive filter 43 may be selected to have a value close to 1 when signals on the first input transducer 10 and the fourth input transducer 50 have a substantially similar magnitude and phase, such as when the magnitude and phase of the signals corresponds. Thus, for example when the transmission delayed band-pass filtered first electric input signal 145 stemming from the first input transducer 10 of the first hearing device 1 and the band pass filtered fourth electric input signal 141 stemming from the fourth input transducer 50 of the second hearing device 61 have close to similar magnitude and phase, the fourth adaptive filter 43 (K) will have a value close to 1, such as between 0.9 and 1. For example when the transmission delayed band-pass filtered first electric input signal 145 stemming from the first input transducer 10 of the first hearing device 1 and the band pass filtered fourth electric input signal 141 stemming from the fourth input transducer 50 of the second hearing device 61 have close to similar magnitude and phase, this may correspond to e.g. own voice or a far field signal from 0 degrees or 180 degrees azimuth. For transmission delayed band-pass filtered first electric input signal 145 and band pass filtered fourth electric input signals 141 having different magnitude and phase, the fourth adaptive filter 43 may have a value smaller than 1, such as smaller than 0.8, such as smaller than 0.6, e.g. between 0 and 0.8, such as between 0 and 0.6. Hereby, the value of the fourth adaptive filter 43 may provide information on where the signal is coming from.

The sixth detection criterion of the one or more detection criteria is a bilateral direction of arrival criterion. In some embodiments, the sixth detection criteria is satisfied when the bilateral direction of arrival estimate indicates that own voice or a far field signal from either 0 degrees azimuth or 180 degrees azimuth is received.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

In accordance with the present disclosure hearing devices, bilateral hearing device systems as well as methods of operating such hearing devices and such bilateral hearing device systems includes the following embodiments or items:

1. A hearing device comprising:
   - a first input transducer configured for providing a first electric input signal,
   - a second input transducer configured for providing a second electric input signal,
   - a voice detector module configured for processing the first electric input signal and the second electric input signal, the voice detector module being configured for detecting own voice of a user of the hearing device based on one or more detection criteria, the voice detector comprising a first band-pass filter configured for band-pass filtering the first electric input signal and a second band-pass filter configured for band-pass filtering the second electric input signal;
   - a processing unit configured for processing the first electric input signal and the second electric input signal, the processing unit being configured for providing a first electric output signal based on the first electric input signal and the second electric input signal; and
   - an output transducer configured for converting the first electric output signal into an acoustic output signal,
   - wherein the voice detector module is further configured for notifying a detection of the own
   - voice to the processing unit if one or more of the detection criteria are satisfied.
2. A hearing device according to any one of the preceding items, wherein a first detection criterion of the one or more detection criteria is a monaural direction of arrival criterion.
3. A hearing device according to any one of the preceding items, wherein the voice detector further comprises:
   - a first primary filter configured for filtering the band-pass filtered first electric input signal to provide
   - a first primary filtered signal; and
   - a first secondary filter configured filtering the band-pass filtered second electric input signal to provide a first secondary filtered signal;

wherein the first primary filter and the first secondary filter are further configured for providing a first directional pattern signal comprising a directional null into a direction of the own voice or a far field signal in front of the user, the first directional pattern signal being based on subtracting the first primary filtered signal from the first secondary filtered signal.

4. A hearing device according to any one of the preceding items, wherein the voice detector further comprises:
   - a second primary filter configured for filtering the band-pass filtered second electric input signal to provide a second primary filtered signal; and
   - a second secondary filter configured for filtering the band-pass filtered first electric input signal to provide a second secondary filtered signal;
   - wherein the second primary filter and the second secondary filter are further configured for providing a second directional pattern signal comprising a directional null opposite the direction of the own voice or the far field signal in front of the user, the second directional pattern signal being based on subtracting the second primary filtered signal from the second secondary filtered signal.
5. A hearing device according to any one of the preceding items, wherein the voice detector module further comprises a first adaptive filter configured for filtering the second directional pattern signal; and
   - wherein the first adaptive filter is further configured for minimizing an error signal of subtracting the first directional pattern signal from the second directional pattern signal filtered by the first adaptive filter.
6. A hearing device according to any one of the preceding items, wherein a monaural direction of arrival estimate is provided by the first adaptive filter;
   - wherein the voice detector further comprises a first attack-and-release filter configured for filtering the monaural direction of arrival estimate.
7. A hearing device according to any one of the preceding items, wherein a second detection criterion of the one or more detection criteria is a first power level difference criterion; wherein a first power level difference estimate is provided by comparing a power level of the band-pass filtered first electric input signal and a power level of the band-pass filtered second electric input signal;
   - wherein the voice detector further comprises a second attack-and-release filter configured for filtering the first power level difference estimate.
8. A hearing device according to any one of the preceding items, wherein a third detection criterion of the one or more detection criteria is a first own voice activity indicator criterion.
9. A hearing device according to any one of the preceding items, wherein the voice detector further comprises:
   - a third primary filter configured for filtering the band-pass filtered first electric input signal to provide a third primary filtered signal, and
   - a third secondary filter configured for filtering the band-pass filtered second electric input signal to provide a third secondary filtered signal; and
   - wherein the third primary filter and the third secondary filter are further configured for providing a third directional pattern signal comprising a directional null into the direction of the own voice, the third directional pattern signal being based on subtracting the third primary filtered signal from the third secondary filtered signal.
10. A hearing device according to any one of the preceding items, wherein the hearing device is further configured for engaging in a training mode, wherein the third primary filter is further configured to be personalized to the user.
11. A hearing device according to any one of the preceding items, wherein the voice detector further comprises:
    - a fourth primary filter configured for filtering the band-pass filtered second electric input signal to provide a fourth primary filtered signal, and
    - a fourth secondary filter configured for filtering the band-pass filtered first electric input signal to provide a fourth secondary filtered signal; and
    - wherein the fourth primary filter and the fourth secondary filter are further configured for providing a fourth directional pattern signal comprising a directional null into a direction of a far field source, the fourth directional pattern signal being based on subtracting the fourth primary filtered signal from the fourth secondary filtered signal.

12. A hearing device according to any one of the preceding items, wherein the voice detector further comprises a second adaptive filter configured for filtering the fourth directional pattern signal; and wherein the second adaptive filter is further configured for minimizing an error signal of subtracting the third directional pattern signal from the fourth directional pattern signal filtered by the second adaptive filter.

13. A hearing device according to any one of the preceding items, wherein a own voice activity indicator estimate is provided by the second adaptive filter;

wherein the voice detector further comprises a third attack-and-release filter configured for filtering the own voice activity indicator estimate.

14. A hearing device according to any one of the preceding items, wherein the hearing device comprises a behind-the-ear unit, the behind-the ear unit comprising the first input transducer and the second input transducer;

wherein the hearing device further comprises a third input transducer configured for providing a third electric input signal, the third input transducer being an in-the-ear input transducer;

wherein the voice detector module is further configured for processing the third electric input signal, the voice detector module further comprising a third band-pass filter configured to band-pass filter the third electric input signal;

wherein the processing unit is further configured for processing the third electric input signal; and wherein the first electric output signal is further based on the third electric input signal.

15. A hearing device according to any one of the preceding items, wherein a fourth detection criterion of the one or more of detection criteria is a second power level difference criterion;

wherein a second power level difference estimate is provided by comparing a power level of the band-pass filtered first electric input signal and a power level of the band-pass filtered third electric input signal;

wherein the voice detector further comprises a fourth attack-and-release filter configured for filtering the second power level difference estimate.

16. A hearing device according to any one of the preceding items, wherein a fifth detection criterion of the one or more detection criteria is a second own voice activity indicator criterion.

17. A hearing device according to any one of the preceding items, wherein the voice detector module further comprises a third adaptive filter configured for filtering the band-pass filtered third electric input signal, and a fifth secondary filter configured for filtering the band-pass filtered first electric input signal to provide a fifth secondary filtered signal; and wherein the third adaptive filter is further configured for minimizing an error signal of subtracting the fifth secondary filtered signal from the band-pass filtered third electric input signal filtered by the third adaptive filter.

18. A bilateral hearing device system, the system comprising an first hearing device and a second hearing device, the first hearing device being a hearing device according to any one of the preceding items further comprising a first wireless communication interface, the second hearing device comprising a second wireless communication interface and a fourth input transducer configured for providing a fourth electric input signal;

wherein the first hearing device is further configured for receiving the fourth electric input signal from the second hearing device via the second wireless communication interface and the first wireless communication interface;

wherein the first hearing device further comprises a fourth band-pass filter configured for band-pass filtering the fourth electric input signal received from the second hearing device;

wherein the voice detector of the first hearing device further comprises:

a transmission delay filter configured to transmission delay the band-pass filtered first electric signal to provide a transmission delayed band-pass filtered first electric input signal, and a fourth adaptive filter configured for filtering the transmission delayed band-pass filtered first electric input signal, the fourth adaptive filter further configured for minimizing an error signal of subtracting the transmission delayed band-pass filtered first electric input signal from the band-pass filtered fourth electric input signal;

wherein a sixth detection criterion of the one or more detection criteria is a bilateral direction of arrival criterion;

wherein a bilateral direction of arrival estimate is provided by the fourth adaptive filter;

wherein the voice detector further comprises a fifth attack-and-release filter configured for filtering the bilateral direction of arrival estimate.

19. A method at a hearing device according to any one of items 1-17, the method comprising detecting if the own voice of the user of the hearing device is present in the first electric input signal and/or second electric input signal and/or third electric input signal based on the one or more detection criteria and, in response to a detection of own voice, providing a detection signal from the voice detector module to the processing unit.

20. A method at a bilateral hearing device system according to item 18 the method comprising detecting if the own voice of the user of the hearing device system is present in the first electric input signal and/or second electric input signal and/or third electric input signal based on the one or more detection criteria and, in response to a detection of own voice, providing a detection signal from the voice detector module to the processing unit.

LIST OF REFERENCES

Reference numbers

1 (first) hearing device
2 voice detector module
4 processing unit
6 output transducer
10 first input transducer
11 first band-pass filter
12 second secondary filter
12' fourth secondary filter
13 first primary filter
14 first adaptive filter
15 front preference coefficient adjustment
16 third primary filter
17 first attack and release filter
18 third attack and release filter

19 attack and release filter
20 second input transducer
21 second band-pass filter
22 first secondary filter
22' third secondary filter
23 second primary filter
24 second adaptive filter
26 fourth primary filter
27 fifth attack and release filter
30 third input transducer
31 third band-pass filter
33 fifth secondary filter
34 third adaptive filter
41 fourth band-pass filter
42 transmission delay filter
43 fourth adaptive filter
44 transmit
50 fourth input transducer
60 bilateral hearing device system
61 second hearing device
100 output
107 notifying signal
108 first electric output signal
110 first electric input signal
111 band-pass filtered first electric input signal
112 second electric input signal.
113 band-pass filtered second electric input signal
114 second secondary filtered signal
115 first primary filtered signal
116 second primary filtered signal
117 first secondary filtered signal
118 second directional pattern signal
119 first directional pattern signal
120 second directional pattern signal filtered by the first adaptive filter
121 fourth secondary filtered signal
122 third primary filtered signal
123 fourth primary filtered signal
124 third secondary filtered signal
125 fourth directional pattern signal
126 third directional pattern signal
127 fourth directional pattern signal filtered by the second adaptive filter,
128 error signal
129 fifth secondary filtered signal
130 third electric input signal
131 band-pass filtered third electric input signal
132 band-pass filtered third electric input signal filtered by the third adaptive filter
133 monaural direction of arrival estimate smoothed
134 own voice activity indicator estimate smoothed
135 second own voice activity indicator smoothed
136 bilateral direction of arrival estimate smoothed
140 fourth electric input signal
141 band-pass filtered fourth electric input signal
143 error signal
145 transmission delayed band-pass filtered first electric input signal

The invention claimed is:

1. A hearing device comprising:

a first input transducer configured to provide a first electric input signal;

a second input transducer configured to provide a second electric input signal;

a voice detector module configured to detect own voice of a user of the hearing device based on one or more detection criteria, the voice detector comprising a first band-pass filter configured for band-pass filtering the first electric input signal, and a second band-pass filter configured for band-pass filtering the second electric input signal;

a processing unit configured to process the first electric input signal and the second electric input signal, the processing unit being configured to provide a first electric output signal based on the first electric input signal and the second electric input signal; and an output transducer configured to provide an acoustic output signal based on the first electric output signal;

wherein the voice detector module is further configured to notify a detection of the own voice to the processing unit if the one or more detection criteria are satisfied;

wherein the voice detector module further comprises:

a first primary filter configured to filter the band-pass filtered first electric input signal to provide a first primary filtered signal; and a first secondary filter configured to filter the band-pass filtered second electric input signal to provide a first secondary filtered signal; and wherein the first primary filter and the first secondary filter are further configured to provide a first directional pattern signal comprising a directional null into a direction of (1) the own voice or (2) a far field signal in front of the user, the first directional pattern signal being based on subtracting the first primary filtered signal from the first secondary filtered signal.

2. The hearing device according to claim 1, wherein the one or more detection criteria comprises a monaural direction of arrival criterion.

3. The hearing device according to claim 1, wherein the voice detector module further comprises:

a second primary filter configured for filtering the band-pass filtered second electric input signal to provide a second primary filtered signal; and a second secondary filter configured for filtering the band-pass filtered first electric input signal to provide a second secondary filtered signal;

wherein the second primary filter and the second secondary filter are further configured to provide a second directional pattern signal comprising a directional null opposite the direction of (1) the own voice or (2) the far field signal in front of the user, the second directional pattern signal being based on subtracting the second primary filtered signal from the second secondary filtered signal.

4. The hearing device according to claim 3, wherein the voice detector module further comprises a first adaptive filter configured to filter the second directional pattern signal; and wherein the first adaptive filter is further configured to reduce or minimize an error signal resulted from subtracting the first directional pattern signal from the second directional pattern signal filtered by the first adaptive filter.

5. The hearing device according to claim 3, wherein the voice detector module further comprises:

a third primary filter configured for filtering the band-pass filtered first electric input signal to provide a third primary filtered signal, and a third secondary filter configured for filtering the band-pass filtered second electric input signal to provide a third secondary filtered signal; and wherein the third primary filter and the third secondary filter are configured to provide a third directional pattern signal comprising a directional null into the direction of the own voice, the third directional pattern signal being based on subtracting the third primary filtered signal from the third secondary filtered signal.

6. The hearing device according to claim 5, wherein when the hearing device is in a training mode, the hearing device allows the third primary filter to be personalized for the user.

7. The hearing device according to claim 5, wherein the voice detector module further comprises:

a fourth primary filter configured for filtering the band-pass filtered second electric input signal to provide a fourth primary filtered signal, and a fourth secondary filter configured for filtering the band-pass filtered first electric input signal to provide a fourth secondary filtered signal; and wherein the fourth primary filter and the fourth secondary filter are configured to provide a fourth directional pattern signal comprising a directional null into a direction of the far field source, the fourth directional pattern signal being based on subtracting the fourth primary filtered signal from the fourth secondary filtered signal.

8. The hearing device according to claim 7, wherein the voice detector module further comprises a first adaptive filter configured to filter the second directional pattern signal;

wherein the first adaptive filter is further configured to reduce or minimize an error signal resulted from subtracting the first directional pattern signal from the second directional pattern signal filtered by the first adaptive filter;

wherein the voice detector module further comprises a second adaptive filter configured for filtering the fourth directional pattern signal; and wherein the second adaptive filter is further configured to reduce or minimize an error signal resulted from subtracting the third directional pattern signal from the fourth directional pattern signal filtered by the second adaptive filter.

9. The hearing device according to claim 8, wherein the second adaptive filter is configured to provide an own voice activity indicator estimate;

wherein the voice detector module further comprises an attack-and-release filter configured to filter the own voice activity indicator estimate.

10. The hearing device according to claim 8, further comprises a third input transducer configured to provide a third electric input signal, the third input transducer being an in-the-ear input transducer;

wherein the voice detector module comprises a third band-pass filter configured to band-pass filter the third electric input signal;

wherein the processing unit is further configured to process the third electric input signal;

wherein the first electric output signal is further based on the third electric input signal;

wherein the voice detector module further comprises a third adaptive filter configured to filter the band-pass filtered third electric input signal.

11. The hearing device according to claim 10, wherein the voice detector module further comprises a fifth secondary filter configured for filtering the band-pass filtered first electric input signal to provide a fifth secondary filtered signal; and wherein the third adaptive filter is further configured to reduce or minimize an error signal resulted from subtracting the fifth secondary filtered signal from the band-pass filtered third electric input signal filtered by the third adaptive filter.

12. A hearing device comprising:

a first input transducer configured to provide a first electric input signal;

a second input transducer configured to provide a second electric input signal;

a voice detector module configured to detect own voice of a user of the hearing device based on one or more detection criteria, the voice detector comprising a first band-pass filter configured for band-pass filtering the first electric input signal, and a second band-pass filter configured for band-pass filtering the second electric input signal;

a processing unit configured to process the first electric input signal and the second electric input signal, the processing unit being configured to provide a first electric output signal based on the first electric input signal and the second electric input signal; and an output transducer configured to provide an acoustic output signal based on the first electric output signal;

wherein the voice detector module is further configured to notify a detection of the own voice to the processing unit if the one or more detection criteria are satisfied;

wherein the voice detector module comprises a first adaptive filter configured to provide a monaural direction of arrival estimate; and wherein the voice detector module further comprises an attack-and-release filter configured to filter the monaural direction of arrival estimate.

13. A hearing device comprising:

a first input transducer configured to provide a first electric input signal;

a second input transducer configured to provide a second electric input signal;

a voice detector module configured to detect own voice of a user of the hearing device based on one or more detection criteria, the voice detector comprising a first band-pass filter configured for band-pass filtering the first electric input signal, and a second band-pass filter configured for band-pass filtering the second electric input signal;

a processing unit configured to process the first electric input signal and the second electric input signal, the processing unit being configured to provide a first electric output signal based on the first electric input signal and the second electric input signal; and an output transducer configured to provide an acoustic output signal based on the first electric output signal;

wherein the voice detector module is further configured to notify a detection of the own voice to the processing unit if the one or more detection criteria are satisfied;

wherein the one or more detection criteria comprises a first power level difference criterion;

wherein the hearing device is configured to obtain a first power level difference estimate by comparing a power level of the band-pass filtered first electric input signal and a power level of the band-pass filtered second electric input signal; and wherein the voice detector module further comprises an attack-and-release filter configured to filter the first power level difference estimate.

14. A hearing device comprising:

a first input transducer configured to provide a first electric input signal;

a second input transducer configured to provide a second electric input signal;

a voice detector module configured to detect own voice of a user of the hearing device based on one or more detection criteria, the voice detector comprising a first band-pass filter configured for band-pass filtering the first electric input signal, and a second band-pass filter configured for band-pass filtering the second electric input signal;

a processing unit configured to process the first electric input signal and the second electric input signal, the processing unit being configured to provide a first electric output signal based on the first electric input signal and the second electric input signal; and an output transducer configured to provide an acoustic output signal based on the first electric output signal;

wherein the voice detector module is further configured to notify a detection of the own voice to the processing unit if the one or more detection criteria are satisfied;

wherein the hearing device comprises a behind-the-ear unit, the behind-the ear unit comprising the first input transducer and the second input transducer;

wherein the hearing device further comprises a third input transducer configured to provide a third electric input signal, the third input transducer being an in-the-ear input transducer;

wherein the voice detector module is further configured to process the third electric input signal, the voice detector module further comprising a third band-pass filter configured to band-pass filter the third electric input signal;

wherein the processing unit is further configured to process the third electric input signal; and wherein the first electric output signal is further based on the third electric input signal.

15. The hearing device according to claim 14, wherein the one or more of detection criteria comprises a power level difference criterion;

wherein the hearing device is configured to obtain a power level difference estimate by comparing a power level of the band-pass filtered first electric input signal and a power level of the band-pass filtered third electric input signal; and wherein the voice detector module further comprises an attack-and-release filter configured to filter the power level difference estimate.

16. The hearing device according to claim 14, wherein the one or more detection criteria comprises a first power level difference criterion;

wherein the hearing device is configured to obtain a first power level difference estimate by comparing a power level of the band-pass filtered first electric input signal and a power level of the band-pass filtered second electric input signal; and wherein the voice detector module further comprises an attack-and-release filter configured to filter the first power level difference estimate;

wherein the one or more of detection criteria comprises a second power level difference criterion;

wherein the hearing device is configured to obtain a second power level difference estimate by comparing the power level of the band-pass filtered first electric input signal and a power level of the band-pass filtered third electric input signal; and wherein the voice detector module further comprises another attack-and-release filter configured to filter the second power level difference estimate.

17. A hearing device comprising:

a first input transducer configured to provide a first electric input signal;

a second input transducer configured to provide a second electric input signal;

a voice detector module configured to detect own voice of a user of the hearing device based on one or more detection criteria, the voice detector comprising a first band-pass filter configured for band-pass filtering the first electric input signal, and a second band-pass filter configured for band-pass filtering the second electric input signal;

a processing unit configured to process the first electric input signal and the second electric input signal, the processing unit being configured to provide a first electric output signal based on the first electric input signal and the second electric input signal; and an output transducer configured to provide an acoustic output signal based on the first electric output signal;

wherein the voice detector module is further configured to notify a detection of the own voice to the processing unit if the one or more detection criteria are satisfied; and wherein the voice detector module comprises a first attack-and-release filter configured to filter a monaural direction of arrival estimate.

18. The hearing device according to claim 17, wherein the one or more detection criteria comprises a first own voice activity indicator criterion.

19. The hearing device according to claim 17, wherein the voice detector module comprises a second attack-and-release filter configured to filter a first power level difference estimate.

20. The hearing device according to claim 19, wherein the voice detector module comprises a third attack-and-release filter configured to filter an own voice activity indicator estimate.

21. The hearing device according to claim 20, wherein the voice detector module comprises a fourth attack-and-release filter configured to filter a second power level difference estimate.

22. The hearing device according to claim 17, wherein the one or more detection criteria comprises a first own voice activity indicator criterion, and a second own voice activity indicator criterion.

23. A method performed by the hearing device of claim 17, the method comprising:

detecting if the own voice of the user of the hearing device is present in the first electric input signal and/or the second electric input signal based on the one or more detection criteria; and in response to a detection of the own voice, providing a detection signal from the voice detector module to the processing unit.

24. The hearing device of claim 17, wherein the hearing device is:

(1) an In-the-Ear hearing device;

(2) a Completely-in-Canal hearing device;

(3) a Behind-the-Ear type hearing device having a behind-the-ear unit; or (4) a part of a bilateral hearing device system.

* * * * *